United States Patent
Ihara et al.

(10) Patent No.: US 11,544,968 B2
(45) Date of Patent: Jan. 3, 2023

(54) INFORMATION PROCESSING SYSTEM, INFORMATION PROCESSINGMETHOD, AND RECORDING MEDIUM

(71) Applicant: SONY CORPORATION, Tokyo (JP)

(72) Inventors: Keigo Ihara, Tokyo (JP); Hideyuki Ono, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 15 days.

(21) Appl. No.: 17/044,066

(22) PCT Filed: Feb. 18, 2019

(86) PCT No.: PCT/JP2019/005729
§ 371 (c)(1),
(2) Date: Sep. 30, 2020

(87) PCT Pub. No.: WO2019/215983
PCT Pub. Date: Nov. 14, 2019

(65) Prior Publication Data
US 2021/0049352 A1 Feb. 18, 2021

(30) Foreign Application Priority Data
May 9, 2018 (JP) .............................. JP2018-090706

(51) Int. Cl.
*G03B 21/14* (2006.01)
*G06V 40/20* (2022.01)
(Continued)

(52) U.S. Cl.
CPC ............ *G06V 40/20* (2022.01); *G03B 21/14* (2013.01); *G06V 40/176* (2022.01); *H04L 51/046* (2013.01)

(58) Field of Classification Search
CPC . G06K 9/00335; G06K 9/00315; G03B 21/14
See application file for complete search history.

(56) References Cited

U.S. PATENT DOCUMENTS

2005/0187437 A1* 8/2005 Matsugu .................. A61B 5/16
128/920
2006/0133586 A1* 6/2006 Kasai ...................... G06F 16/40
707/E17.009
(Continued)

FOREIGN PATENT DOCUMENTS

JP 2005-237561 A 9/2005
JP 2005-352645 A 12/2005
(Continued)

OTHER PUBLICATIONS

International Search Report dated Apr. 9, 2019 in PCT/JP2019/005729 filed on Feb. 18, 2019, 2 pages.

*Primary Examiner* — Myron Wyche
(74) *Attorney, Agent, or Firm* — Oblon, McClelland, Maier & Neustadt, L.L.P.

(57) ABSTRACT

An information processing system, an information processing method, and a recording medium, which implement effective information presentation by presentation of information when a user is in a situation where information is easily acceptable, are to be provide. An information processing system including a control unit that controls a presentation unit to present a message to a user when the user is presumed, based on sensing data related to the user, to be in a situation where a message is easily acceptable.

20 Claims, 18 Drawing Sheets

(51) Int. Cl.
   *H04L 51/046* (2022.01)
   *G06V 40/16* (2022.01)

(56) References Cited

U.S. PATENT DOCUMENTS

2017/0330495 A1* 11/2017 Doi .................... G06T 5/006
2018/0107445 A1*  4/2018 Ohmura .............. G06F 3/16

FOREIGN PATENT DOCUMENTS

| | | |
|---|---|---|
| JP | 2006-163911 A | 6/2006 |
| JP | 2014-21428 A | 2/2014 |
| JP | 2014-123277 A | 7/2014 |
| JP | 2017-87876 A | 5/2017 |
| WO | WO 2014/045683 A1 | 3/2014 |
| WO | WO 2016/125359 A1 | 8/2016 |
| WO | WO 2016/158792 A1 | 10/2016 |

* cited by examiner

INFORMATION PROCESSING SYSTEM, INFORMATION PROCESSINGMETHOD, AND RECORDING MEDIUM

FIELD

The present disclosure relates to an information processing system, an information processing method, and a recording medium.

BACKGROUND

Mobile device technology and communication technology typified by smartphones and wearable devices, such as smartwatches, have evolved in recent years and necessary information is now able to be acquired any time. Furthermore, technology related to display devices, such as large-screen liquid crystal displays and single-focus projectors, has also evolved largely, and where to display information is thus now less limited and information has started to be able to be displayed anywhere.

With such technical background, techniques for displaying information in various scenes have been proposed. For example, Patent Literature 1 cited below has, disclosed therein, displaying an icon immediately before information, such as an e-mail, is read out with voice in a car, the icon reflecting the content of the information.

Furthermore, Patent Literature 2 cited below has, disclosed therein, a technique for starting a projector so that the projector serves a lighting function and projects a message, by installation of the projector at an entrance or the like and a light switch at the entrance being turned on by a family member who has returned home.

Furthermore, Patent Literature 3 cited below has, disclosed therein, a technique for projecting information useful to a passenger or image information needed by the passenger, onto a road surface when the passenger gets out of a car, by means of a projector attached to a side mirror of the car.

Furthermore, Patent Literature 4 cited below has, disclosed therein, projection navigation where a user's behavior is predicted, a guide image is generated, and the guide image is displayed on a wall, a corridor, or the like by a projector.

Furthermore, Patent Literature 5 cited below has, disclosed therein, a technique for displaying a user interface (UI) image, such as a mouse pad region, to a user wearing a transparent head-mounted display (HMD), so that any real object is able to be used as a UI.

CITATION LIST

Patent Literature

Patent Literature 1: Japanese Laid-open Patent Publication No. 2005-352645

Patent Literature 2: Japanese Laid-open Patent Publication No. 2014-021428

Patent Literature 3: Japanese Laid-open Patent Publication No. 2017-087876

Patent Literature 4: Japanese Laid-open Patent Publication No. 2014-123277

Patent Literature 5: International Publication Pamphlet No. WO 2014/045683

SUMMARY

Technical Problem

However, according to the conventional techniques mentioned above, situations of users receiving information presented are not considered. Therefore, if a user is not in a state where information is easily acceptable, like when the user is in a panic, presentation of information, such as messages, at various places may not allow the presented information to be sufficiently recognized and the presented information may be overlooked.

Therefore, according to the present disclosure, an information processing system, an information processing method, and a recording medium are proposed, the information processing system, the information processing method, and the recording medium implementing effective information presentation by presentation of information when a user is in a situation where information is easily acceptable.

Solution to Problem

According to the present disclosure, an information processing system is provided that includes a control unit that controls a presentation unit to present a message to a user when the user is presumed, based on sensing data related to the user, to be in a situation where a message is easily acceptable.

According to the present disclosure, an information processing method is provided, wherein a processor performs processing including controlling a presentation unit to present a message to a user when the user is presumed, based on sensing data related to the user, to be in a situation where a message is easily acceptable.

According to the present disclosure, a recording medium is provided that includes a program for causing a computer to function as a control unit that controls a presentation unit to present a message to a user when the user is presumed, based on sensing data related to the user, to be in a situation where a message is easily acceptable.

Advantageous Effects of Invention

As described above, according to the present disclosure, more effective information presentation is implemented by presentation of information when a user is in a situation where information is easily acceptable.

The above effect is not necessarily limiting, and together with the effect, or instead of the effect, any of effects disclosed in this specification or any other effect that is able to be perceived from this specification may be achieved.

DESCRIPTION OF EMBODIMENTS

Preferred embodiments of the present disclosure will hereinafter be described in detail, while reference is made to the appended drawings. Redundant explanation will be omitted by assignment of the same reference sign to any components having substantially the same functional configuration, throughout the specification and drawings.

Furthermore, description will be made in the following order.

Figure 1:
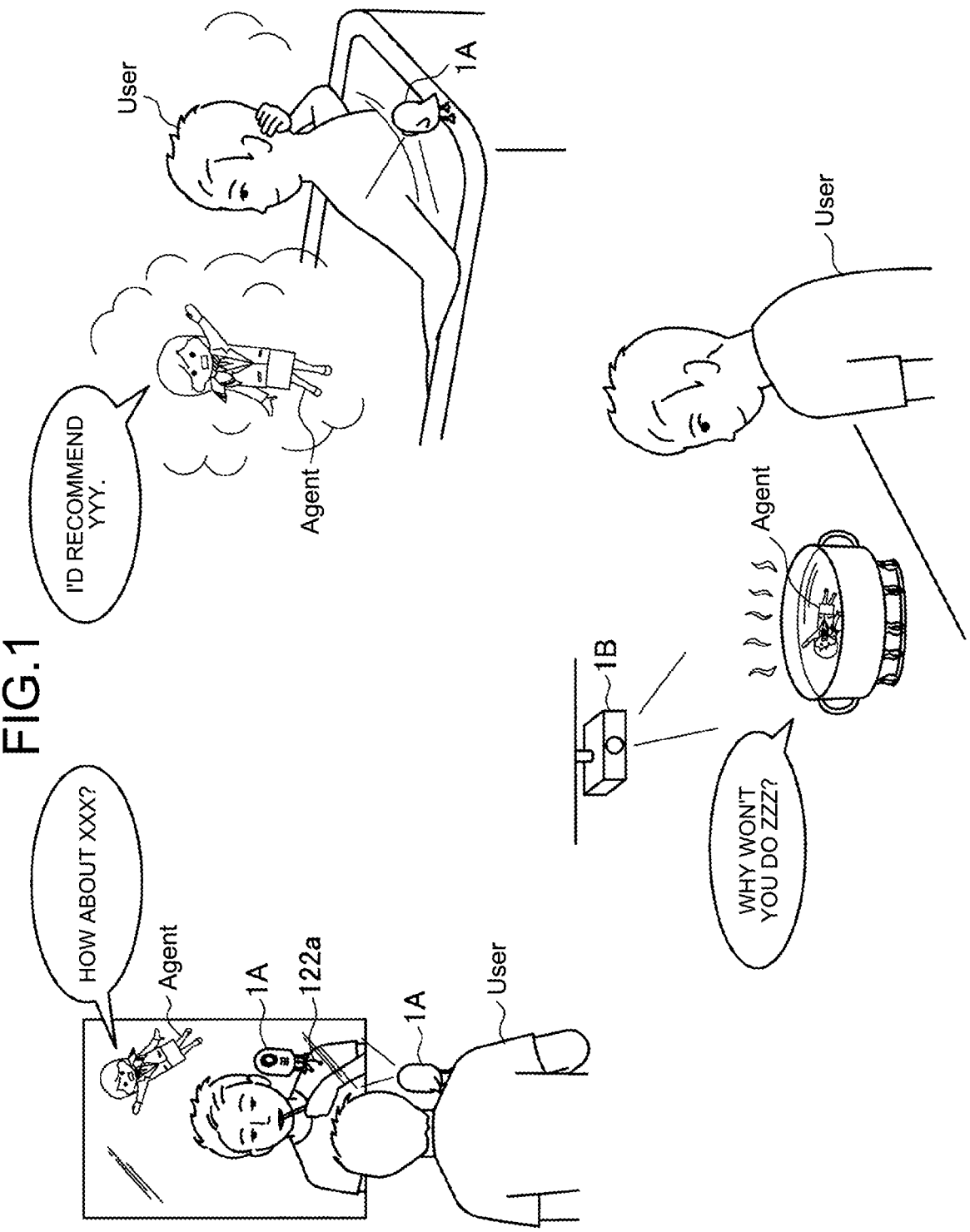
FIG. 1 is a diagram for explanation of an outline of an information processing system according to one embodiment of the present disclosure.

1. Outline of Information Processing System According to One Embodiment of Present Disclosure
2. Configuration Example
    2-1. Example of System Configuration
    2-2. Example of Configuration of Output Device 1
    2-3. Example of Configuration of Management Server 2
3. Examples
    3-1. First Example (Presentation of Message)
    3-2. Second Example (Presentation According to Message Content and User State)
    3-3. Third Example (Change of User Situation)
    3-4. Fourth Example (Presentation at Place Visually Recognizable by User)
    3-5. Fifth Example (Learning "Situation Where Message is Easily Acceptable")
4. Conclusion 1. OUTLINE OF INFORMATION PROCESSING SYSTEM ACCORDING TO ONE EMBODIMENT OF PRESENT DISCLOSURE FIG. 1 is a diagram for explanation of an outline of an information processing system according to one embodiment of the present disclosure. As illustrated in FIG. 1, in the information processing system according to the embodiment, information presentation is performed in various scenes in daily life, using an output device 1. Supposed examples of the output device 1 include a projector that projects images onto various places, such as walls and floors. The projector may be a wearable projector that is portable by being held or worn by a user, or a stationary projector that is fixed at any of various places, such as a room, an entrance, a kitchen, and a bathroom. The wearable projector may be, for example, an output device 1A of a shoulder-sitting type as illustrated in FIG. 1. (For example, the wearable projector may be formed in a companionable compact shape of a character. Furthermore, the method of wearing the shoulder-sitting type projector is not particularly limited, but, for example, the shoulder-sitting type projector may be fixed to the body with a clip or a belt.) In addition, the wearable projector may be attached to (integrated with) a hat, a helmet, glasses, or the like, may be worn by being hung around the neck, or may be attached to a belt wrapped around the chest or waist. What is more, the projector may be a driven projector that is able to be driven in panning and tilting directions. The output device 1 may control the angle or the like of the projector to project an image onto a predetermined projection place. Furthermore, the projector may be a mobile projector that is movable to the front, back, left, right, and the like, in addition to being able to be driven in the panning and tilting directions.

By use of any of such various projectors, the information processing system according to the embodiment allows information to be presented to a user in various scenes in daily life.

As described above, if a user is not in a state where the user is able to accept information situationally, for example, if the user is chatting with friends, if the user is in a noisy environment, if the user is in a hurry, if the user is in a panic, if the user is excited, or if the user is moving the body hard; presentation of information, such as messages, at various places may not enable the presented information to be sufficiently recognized and the presented information may be overlooked. Furthermore, even if the user is able to recognize a message in such a case, the user may be in a state where the user is mentally unable to accept the message (for example, the user may ignore the message or may be displeased).

Therefore, according to the embodiment, by performing information presentation when a user is in a situation where information is easily acceptable, in view of situations of the user accepting information presentation, more effective information presentation is implemented. The output device 1 according to the embodiment is provided with various sensors for detecting a situation of a user or the surroundings (for example, a microphone that detects a voice or an environmental sound, a position measuring unit that measures an indoor/outdoor position, a biosensor that detects a body temperature, a heart rate, and the like, a motion sensor that detects motion, and a distance measuring sensor that detects a distance from an object). Based on various sensing data, the output device 1 determines whether or not a user is in a situation where information is easily acceptable, and performs information presentation if the user is in the situation where information is easily acceptable. For example, the output device 1A illustrated in FIG. 1 has a biosensor 122a, a cord having the biosensor 122a at a distal end of the cord is drawn out from the output device 1A and attached to the user's body, and the user's heart rate, body temperature, and the like are constantly detected.

In this specification, "a situation where information is easily acceptable" may be, for example, a case where the user's mental state is calm, a state where the user's emotions are flat, a state where the user is relaxed, or a state where the user is absent-minded. Such metal situations of a user are able to be recognized by, for example: biosensor data including heart rates, body temperatures, and respiration; and/or facial expressions, muttering, and motion. Furthermore, in addition to such mental states, a case where the user is not having a conversation with another, a case where the user is not busily moving around, a case where the user is stationary, a case where the user is in a quiet environment, and a case where the user is alone, may also be presumed to be "situations where information is easily acceptable". These states are able to be recognized by, for example, analysis of voice data collected by a microphone, or analysis of acceleration information detected from motion sensor data.

Furthermore, a "situation where information is easily acceptable" may be determined based on, for example, the following basic behavior of the user.

When there has been no keystroke for a given time period when the user is using a PC (the user is unlikely to be in a working state and information presentation is thus able to be accepted by the user without disturbing the user).

When the user says the first words to an agent terminal, such as an AI speaker, as the user wakes up in the morning (the user is in a condition to accept information).

Information presented by the output device 1 to a user may be a response from an agent system that recommends content or behavior according to context, or may be information presented by an information presentation system that presents various types of information, such as e-mails, messages, notification information, recommendation information, advertising information, and health information. The information processing system according to the embodiment may be used as a common foundation (platform) that controls timing of presentation of various types of information output from such various systems to a user.

Furthermore, information presented to a user from the output device 1 may be, for example, any of text, voice data, or an image (a moving image or a still image), or a combination including at least any of text, voice data, or an image (a moving image or a still image). If the information is a response from an agent system, an image of an agent (a character image) may be displayed and a message may be read out in the agent's voice, and the information may thereby be made easier to be accepted by the user.

Furthermore, the output device 1 may present information by projecting the information onto a wall, a corridor, a ceiling, or a piece of furniture, such as a table, or as illustrated in FIG. 1, by projecting onto a mirror, vapor (white smoke-like matter), a water surface (hot water or oil filling a saucepan), or the like. For example, in an example illustrated in FIG. 1, since a user is in a calm state when the user is looking in a mirror and brushing his teeth, the output device 1A projects an agent onto a surface of the mirror and outputs a message from an agent system in voice. In addition, when the user is soaking himself in a bathtub and relaxed, the output device 1A projects the agent onto vapor or a mirror surface in the bathroom and outputs a message from the agent system in voice. What is more, when the user is in an idle moment while waiting for water to boil during cooking, a stationary output device 1B provided in the kitchen projects the agent onto the water surface in the saucepan and outputs a message from the agent system in voice. In each of these examples, projecting the agent in the user's view attracts the user's attention, presents information by voice output, text display, and the like, and enables the user to accept the information without stress. The voice of the agent is output from, for example, a speaker provided in the output device 1. The voice of the agent may be output in voice by use of a directional speaker or mosquito sound, such that only the user is able to hear the voice. Furthermore, the voice of the agent may be sound-localized to be heard from the direction where the agent is projected (like audio augmented reality (AR)).

Furthermore, the information processing system according to the embodiment may output information differently by comparing content of information presented and a user's situation. As a result, an easily acceptable message matching a user's situation is able to be presented at an easily acceptable time.

Furthermore, when a user is not in a situation where information is easily acceptable, the information processing system according to the embodiment may present information prompting the user's situation to change, cause the user to be in a situation where information is easily acceptable, and thereafter perform information presentation.

An outline of the information processing system according to the embodiment has been described above. The output device 1 is not necessarily a projector that displays an image by projecting the image onto a real object, and may be: a display device, such as a smartphone, a smart band, a smartwatch, a tablet terminal, a PC, a television device, or a gaming device, which has a display screen; or a transparent or non-transparent head-mounted display (HMD). When a transparent HMD is used, an agent image may be displayed in a user's view by AR where an image is superimposedly displayed on real space. Furthermore, when a user is watching a virtual space video with a non-transparent HMD, an agent image may be displayed on the virtual space video. In addition, the output device 1 may be a voice output device not having a display means, such as smart earphones or a smart necklace.

A configuration of the information processing system according to the embodiment will be described specifically next by reference to the drawings.

2. EXAMPLE OF CONFIGURATION

2.1. Example of System Configuration

Figure 2:
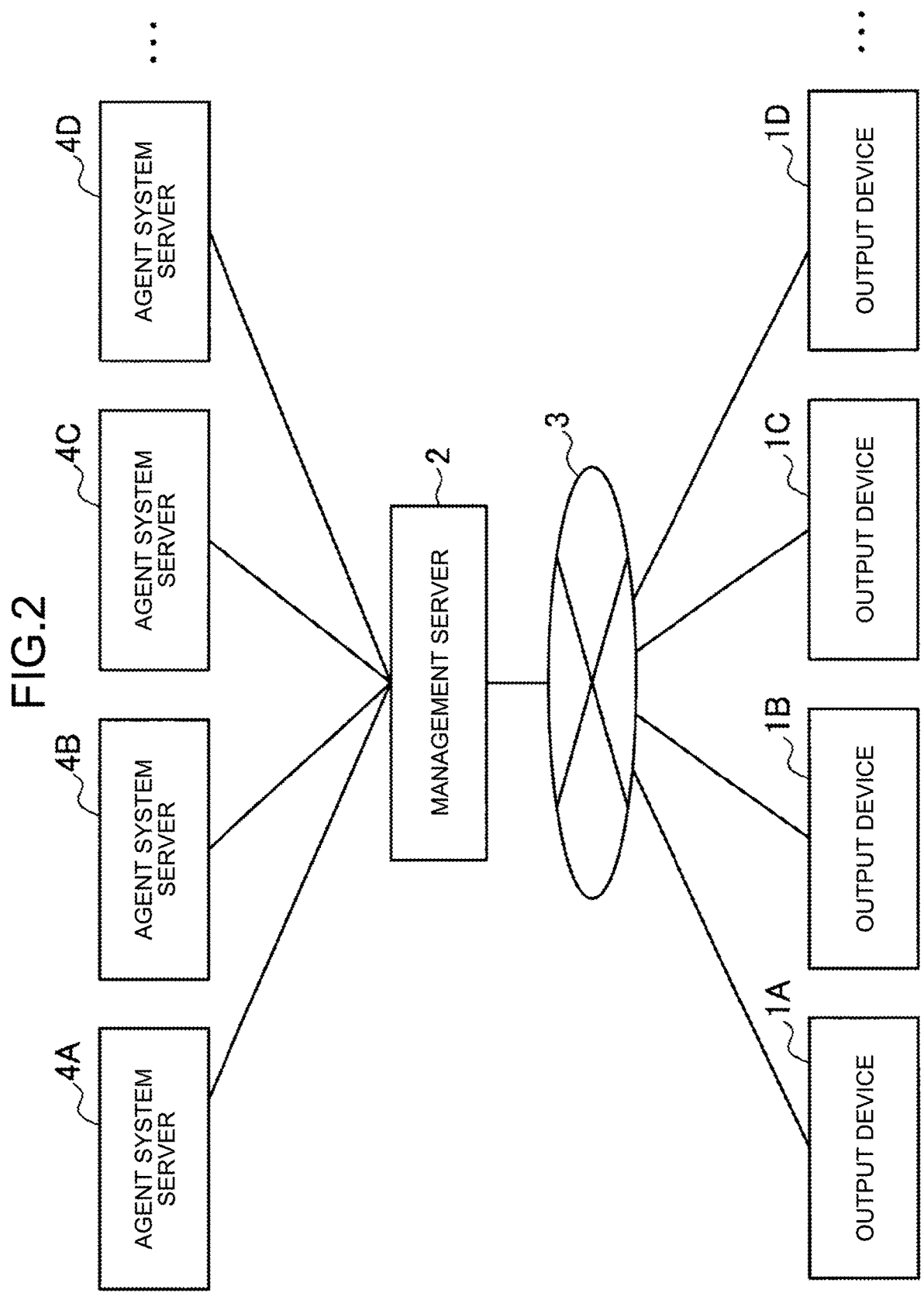
FIG. 2 is a diagram illustrating an example of an overall configuration of the information processing system according to the embodiment.

FIG. 2 is a diagram illustrating an example of an overall configuration of the information processing system according to the embodiment. As illustrated in FIG. 2, the information processing system according to the embodiment includes the output device 1 and a management server 2. The output device 1 and the management server 2 may be connected to each other via a network 3. The output device 1 may be a wearable projector carried by a user, or a stationary projector.

When the management server 2 receives a message from an agent system server 4, for example, the management server 2 controls the output device 1 to output the message if a user is in a situation where a message is easily acceptable, according to a user situation based on sensing data of the user, the sensing data having been acquired from the output device 1. A case where a message is received from an agent system is described herein as an example, but the embodiment is not limited to this example. For example, the management server 2 may receive information from a general information presentation system, for example, a content recommendation system (recommending various types of content information, such as music, movies, events, and games) or a health care system (presenting health management information), or may receive a message from a mail server or a social network server.

Furthermore, the management server 2 does not necessarily receive a message from a general agent system that makes response of one direct and short-term session to a user, and may, for example, receive a message from a new system called a master system that prompts a user to change behavior for the user to gradually progress toward solution to a problem from a long-term perspective. A master is an example of a virtual agent that prompts a user to spontaneously change behavior, and a master system may, for example, automatically generate predetermined code of conduct for a specific community or for each user, indirectly prompt change of behavior based on the code of conduct, and thereby solve a problem in the community. While the user is behaving according to words of the master (a master-like being), without being aware of the code of conduct, the problem in the community is able to be solved or the user is able to behave in accordance with values in the community, and the community's situation is thus able to be improved, without the user being aware of the improvement.

2-2. Example of Configuration of Output Device 1

Figure 3:
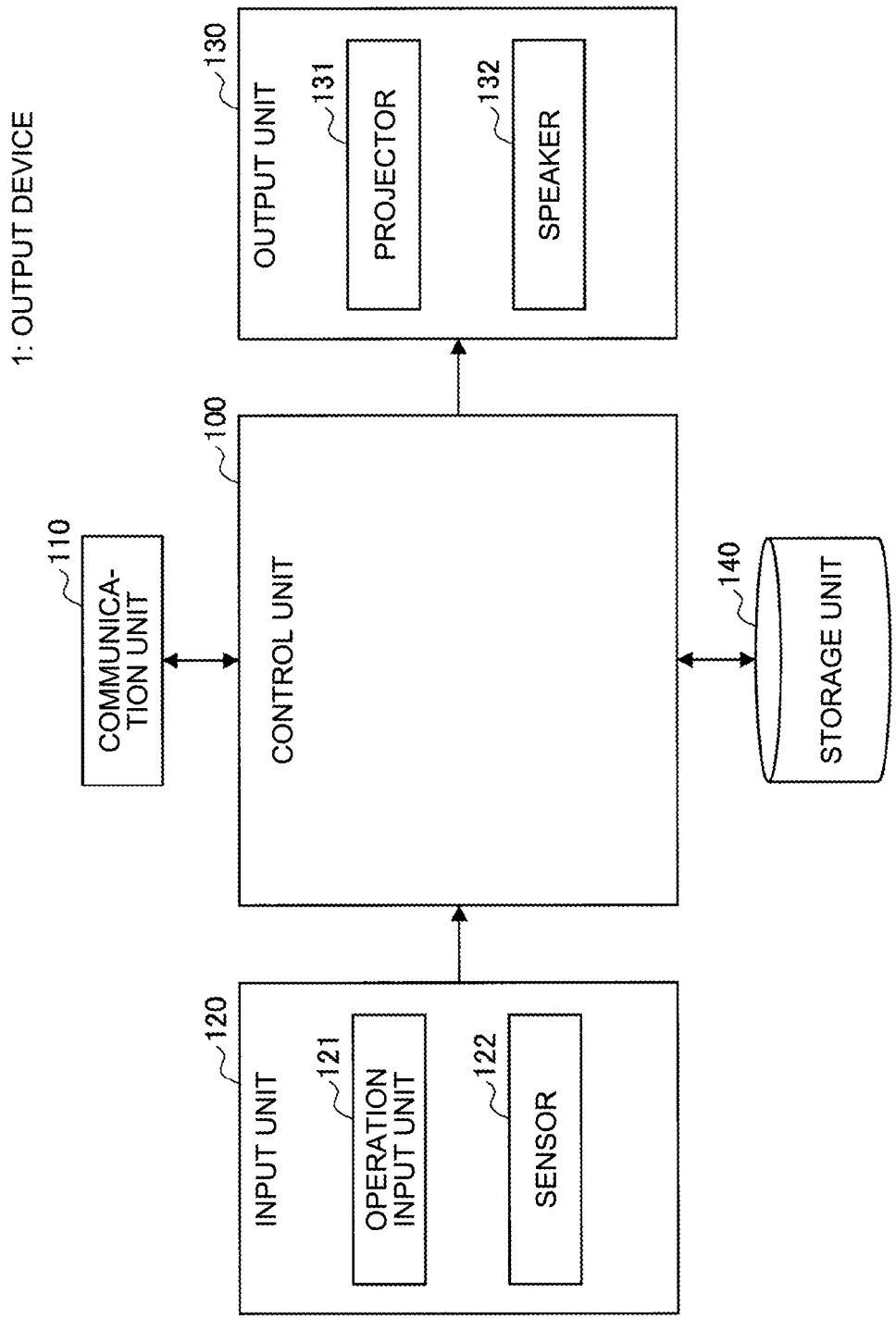
FIG. 3 is a block diagram illustrating an example of a configuration of an output device according to the embodiment.

A configuration of the output device 1 will be described next by reference to FIG. 3. FIG. 3 is a block diagram illustrating an example of the configuration of the output device 1 according to the embodiment. As illustrated in FIG. 3, the output device 1 has a control unit 100, a communication unit 110, an input unit 120, an output unit 130, and a storage unit 140.

The control unit 100 functions as an arithmetic processing device and a control device, and controls the overall operation in the output device 1 according to various programs. The control unit 100 is implemented by an electronic circuit, such as a central processing unit (CPU) or a microprocessor, for example. Furthermore, the control unit 100 may include: a read only memory (ROM) that stores therein programs, arithmetic parameters, and the like to be used; and a random access memory (RAM) that temporarily stores therein parameters and the like that change as appropriate.

Furthermore, the control unit 100 according to the embodiment may perform: control of transmitting sensing data acquired from a sensor 122, to the management server 2, from the communication unit 110; and control of outputting information received from the management server 2 via the communication unit 110 from the output unit 130. In addition, the control unit 100 may perform analysis of various sensing data (such as voice recognition, analysis of biological data, object recognition based on a camera image and/or distance measurement data, recognition of a movement state, expression analysis, motion analysis, posture recognition, facial recognition, or line-of-sight recognition).

Communication Unit 110

The communication unit 110 is connected to the network 3 wiredly or wirelessly, and transmits and receives data to and from the management server 2 on the network. The communication unit 110 is communicably connected to the network 3 via, for example, a wired/wireless local area network (LAN), Wi-Fi (registered trademark), Bluetooth (registered trademark), or a mobile communication network (long term evolution (LTE) or the third generation (3G) mobile communication system).

Input Unit 120

The input unit 120 has an operation input unit 121 and the sensor 122, and inputs information acquired from the operation input unit 121 or the sensor 122, into the control unit 100. The operation input unit 121 detects input of a user's operation on the output device 1. The operation input unit 121 may be, for example, a touch sensor, a pressure sensor, or a proximity sensor; or may be physically configured as any of buttons, switches, and levers.

The sensor 122 includes various sensors that sense a user situation or a surrounding environment, and input data sensed, into the control unit 100. The sensor 122 may be, for example: a position measuring unit (measuring outdoor positions using a global positioning system (GPS) or the like, or measuring indoor positions using Bluetooth, Wi-Fi, or the like); a camera; a microphone (hereinafter, referred to as a mike); a distance measuring sensor; a thermosensor (provided, for example, in a stationary projector and measuring body temperature of a user); an ultrasonic sensor; a motion sensor (for example, an acceleration sensor, a gyrosensor, or a magnetic field sensor); a biosensor (detecting, for example, body temperatures, veins, pulses, heart rates, respiration, perspiration, blood pressure, brain waves, ocular potential, myoelectric values, eyeball movement, lines of sight, and/or the like); or an environment sensor (for example, for illuminance, air temperature, and/or humidity).

Output Unit 130

The output unit 130 is a presentation unit that presents information to a user, according to control of the control unit 100. The output unit 130 has a projector 131 and a speaker 132. The projector 131 is an example of an information display means that is capable of projecting an image onto various places, such as walls, floors, ceilings, mirror surfaces, and vapor. The projector 131 is used herein as the information display means, but without being limited to the projector 131, the information display means according to the embodiment may be a display unit implemented by a liquid crystal display (LCD) device, an organic light emitting diode (OLED) device, or the like.

The speaker 132 reproduces a voice signal according to control of the control unit 100. The speaker 132 may be, for example, a directional speaker. Using a directional speaker allows just a user to hear the voice of an agent. Furthermore, by using mosquito sound in consideration of the age or the like of a user, the speaker 132 may make just the user hear the voice of the agent. In addition, the speaker 132 may be capable of implementing voice AR, by the control unit 100 reproducing a voice signal sound-localized such that the voice of an agent is heard from the direction where an image of the agent is projected.

Storage Unit 140

The storage unit 140 is implemented by a read only memory (ROM) that stores therein programs and arithmetic parameters used in processing by the control unit 100, and a random access memory (RAM) that temporarily stores therein parameters and the like that change as appropriate.

An example of the configuration of the output device 1 according to the embodiment has been described above specifically. The configuration of the output device 1 is not limited to the example illustrated in FIG. 3, and for example, the output device 1 may be formed of plural devices, or the output unit 130 may further have a display device.

2-3. Example of Configuration of Management Server 2

Figure 4:
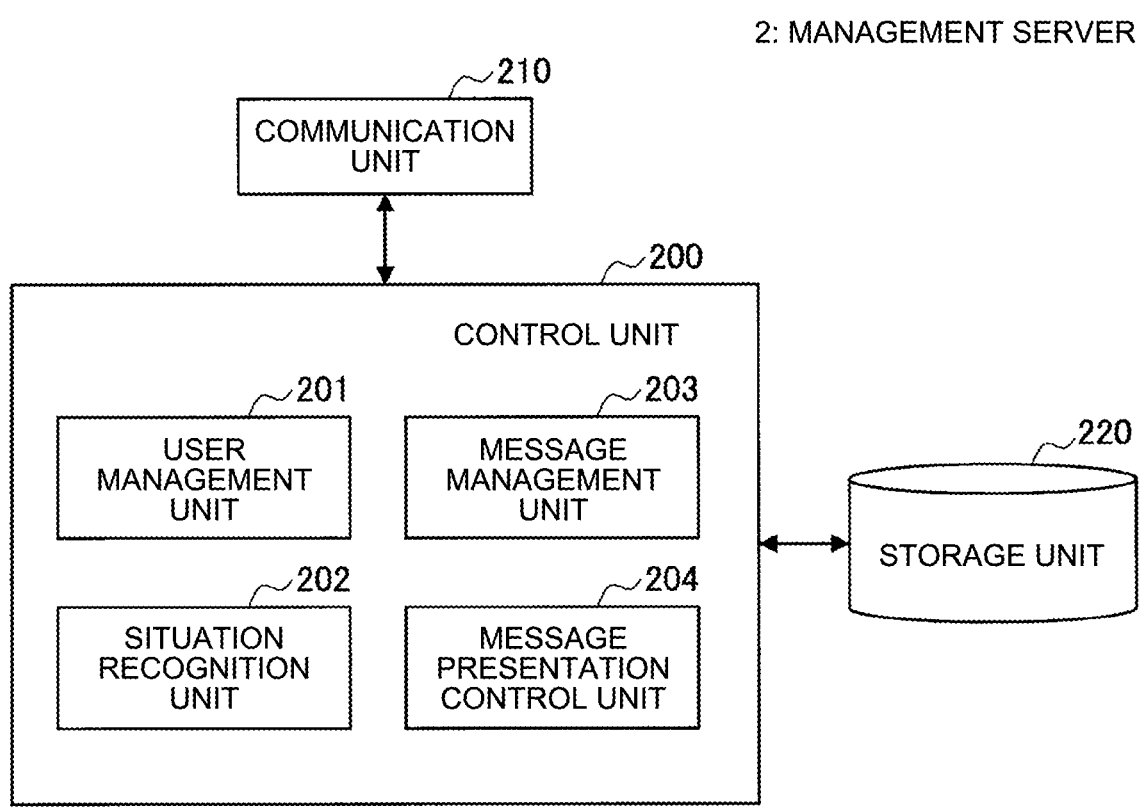
FIG. 4 is a block diagram illustrating an example of a configuration of a management server according to the embodiment.

A configuration of the management server 2 will be described next by reference to FIG. 4. FIG. 4 is a block diagram illustrating an example of the configuration of the management server 2 according to the embodiment. As illustrated in FIG. 4, the management server 2 (an information processing device) has a control unit 200, a communication unit 210, and a storage unit 220.

Control Unit 200

The control unit 200 functions as an arithmetic processing device and a control device and controls the overall operation in the management server 2 according to various programs. The control unit 200 is implemented by an electronic circuit, such as a central processing unit (CPU) or a microprocessor, for example. Furthermore, the control unit 200 may include: a read only memory (ROM) that stores therein programs, arithmetic parameters, and the like to be used; and a random access memory (RAM) that temporarily stores therein parameters and the like that change as appropriate.

Furthermore, the control unit 200 according to the embodiment also functions as a user management unit 201, a situation recognition unit 202, a message management unit 203, and a message presentation control unit 204.

The user management unit 201 manages information related to each user who manipulates the output device 1 (such as identification information, attribute information including the age, sex, and the like, preference information, and/or terminal information of the output device 1). The information on each user may be stored in the storage unit 220.

The situation recognition unit 202 performs recognition of a situation of a user himself or an environment surrounding the user, based on sensing data or a result of analysis on the sensing data, which have or has been received from the output device 1. For example, the situation recognition unit 202 performs recognition of whether the user is talking to someone, the user is in a panic or a hurry, the user is in a noisy environment, the user is alone, the user is being still and calm, the user is excited, or the like. Furthermore, the situation recognition unit 202 may presume whether or not the user is in a situation where a message is easily acceptable.

The message management unit 203 manages information, which has been received from the agent system server 4 and is to be conveyed to a user, in association with identification information or the like of the user. The information to be conveyed to the user may be, as described above: a response message to the user from an agent; an email addressed to the user; a message addressed to the user via a social network; notification information, recommendation information, advertisement information, or health information to the user; or the like. Furthermore, the information to be convey to the user may be a message received from a master system (a master indicating the user's code of conduct) and prompting the user to spontaneously change the user's behavior. The message management unit 203 accumulates such messages in association with the user, into the storage unit 220.

If the situation recognition unit 202 has presumed that a user is in a situation where a message is easily acceptable, the message presentation control unit 204 extracts a message addressed to the user from the storage unit 220 and performs control so that the message is presented to the user from the output device 1. Upon receipt of a message from the agent system server 4, the message presentation control unit 204 may determine whether or not the message is able to be presented (in real time), based on a result of recognition of a current situation of the user by the situation recognition unit 202. Furthermore, if the message is unable to be presented, the message presentation control unit 204 may perform control so that the message is presented when the user is presumed by the situation recognition unit 202 thereafter to have been brought into a situation where a message is easily acceptable.

Furthermore, the message presentation control unit 204 may compare a user situation with content of a message, and if the content of the message matches the user situation, the message presentation control unit 204 may perform control so that the message is presented when the user is in a situation where a message is easily acceptable.

Furthermore, if the situation recognition unit 202 has presumed that a user is not in a situation where a message is easily acceptable, the message presentation control unit 204 may transmits a message to change the user situation (such as the situation of the user himself, like his emotion, or an environment surrounding the user).

Communication Unit 210

The communication unit 210 is connected to the network 3 wiredly or wirelessly, and transmits and receives data to and from each output device 1 via the network 3. The communication unit 210 is communicably connected to the network 3 by, for example, a wired/wireless local area network (LAN), Bluetooth, or wireless fidelity (Wi-Fi) (registered trademark).

Storage Unit 220

The storage unit 220 is implemented by a ROM storing therein programs, arithmetic parameters, and the like to be used in processing by the control unit 200, and a RAM temporarily storing therein parameters and the like that change as appropriate. For example, the storage unit 220 according to the embodiment may store therein a message received from the agent system server 4.

A configuration of the management server 2 according to the embodiment has been described specifically above. The configuration of the management server 2 illustrated in FIG. 4 is just an example, and the embodiment is not limited to this example. For example, at least a part of the configuration of the management server 2 may be in an external device, or at least a part of functions of the control unit 200 may be implemented by the output device 1, an edge server, or the like. Furthermore, all of the storage unit 140 and components of the control unit 200 illustrated in FIG. 4 may be provided in the output device 1 and control for presentation of a message received from the agent system server 4 according to a user situation may be executed by means of an application in the output device 1.

3. EXAMPLES

Examples of the information processing system according to the embodiment will be described specifically next using the drawings.

3-1. First Example (Presentation of Message)

Firstly, First Example of the embodiment will be described by reference to FIG. 5 to FIG. 7. In First Example, presenting a message to a user when the user is in a situation where a message is easily acceptable enables information to be presented more effectively.

Figure 5:
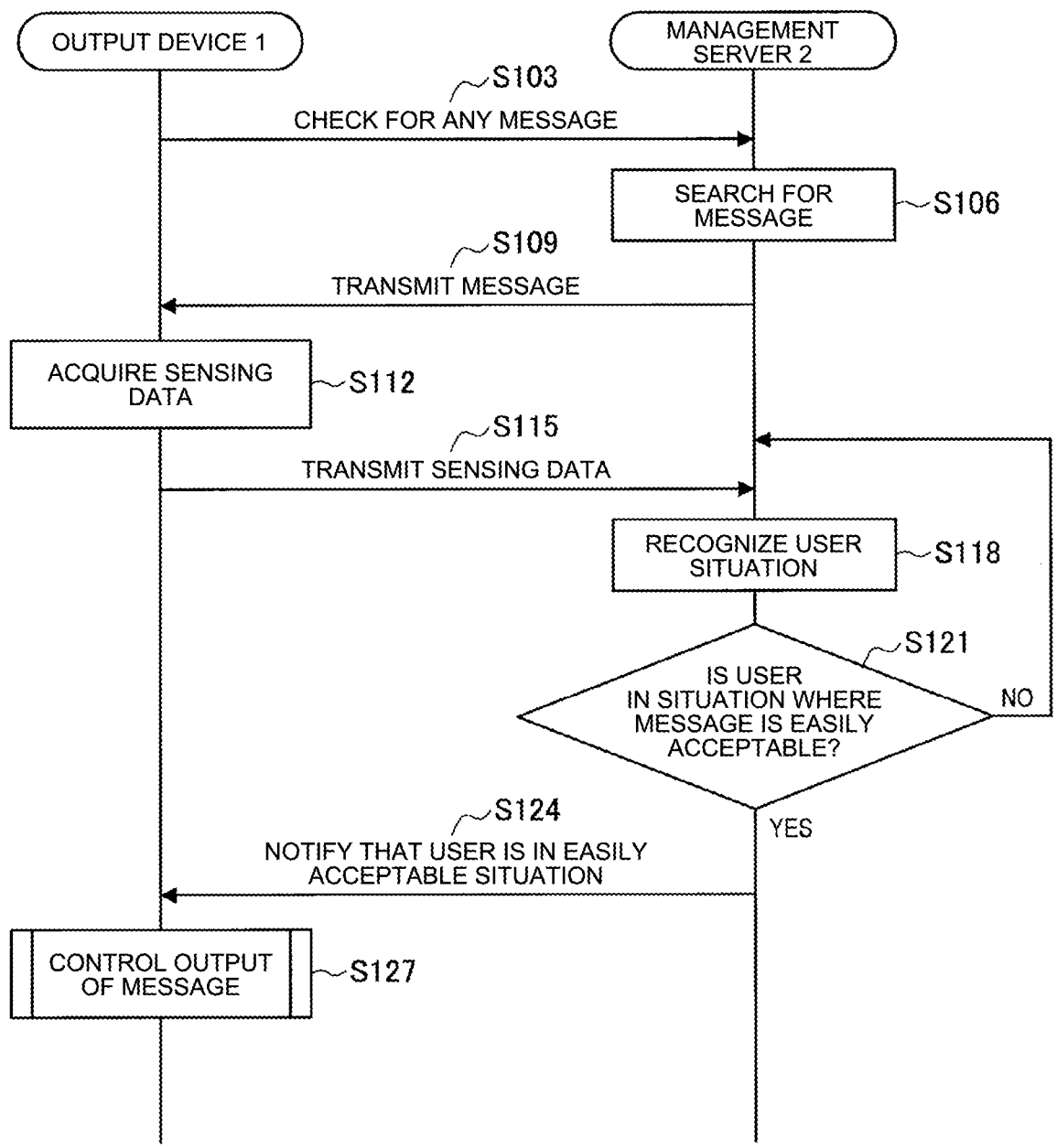
FIG. 5 is a sequence diagram illustrating an example of a flow of information presentation processing according to First Example.

FIG. 5 is a sequence diagram illustrating an example of a flow of information presentation processing according to First Example. As illustrated in FIG. 5, firstly, the output device 1 checks the management server 2 for any message (Step S103).

Subsequently, the user management unit 201 in the management server 2 performs a search for a message (Step S106). The user management unit 201 may search for a message to be conveyed to a user by inquiring the agent system server 4, or search for a message addressed to the user from messages, which have been received beforehand from the agent system server 4 and accumulated in the storage unit 220.

Subsequently, the management server 2 transmits the message retrieved, to the output device 1 (Step S109).

Subsequently, the output device 1 acquires sensing data from the sensor 122 (Step S112) and transmits the sensing data acquired, to the management server 2 (Step S115). The output device 1 may transmit a result of analysis of the sensing data, to the management server 2 in real time.

Subsequently, the situation recognition unit 202 in the management server 2 performs recognition of a user situation, based on information transmitted from the output device 1 (such as the sensing data, or the result of the analysis of the sensing data) (Step S118). Details of processing of the recognition of a user situation will be described later by reference to FIG. 7.

Subsequently, if it has been presumed that the user is in a situation where a message is easily acceptable (Step S121/Yes), the management server 2 notifies the output device 1 of the fact that the user is in a situation where a message is easily acceptable (Step S124).

The output device 1 performs control of output of a message to the user, according to the notification from the management server 2 (Step S127). Details of the control of the output of a message to the user will be described later by reference to FIG. 6.

Therefore, First Example enables a message to be output to a user when the user is in a situation where a message is easily acceptable.

Output Control Processing for Message

An example of output control processing for a message represented by Step S127 mentioned above will be described by reference to FIG. 6. FIG. 6 is a flow chart illustrating an example of a flow of the output control processing for a message, according to First Example. A case where a message is output using the projector 131 will be described herein.

Figure 6:
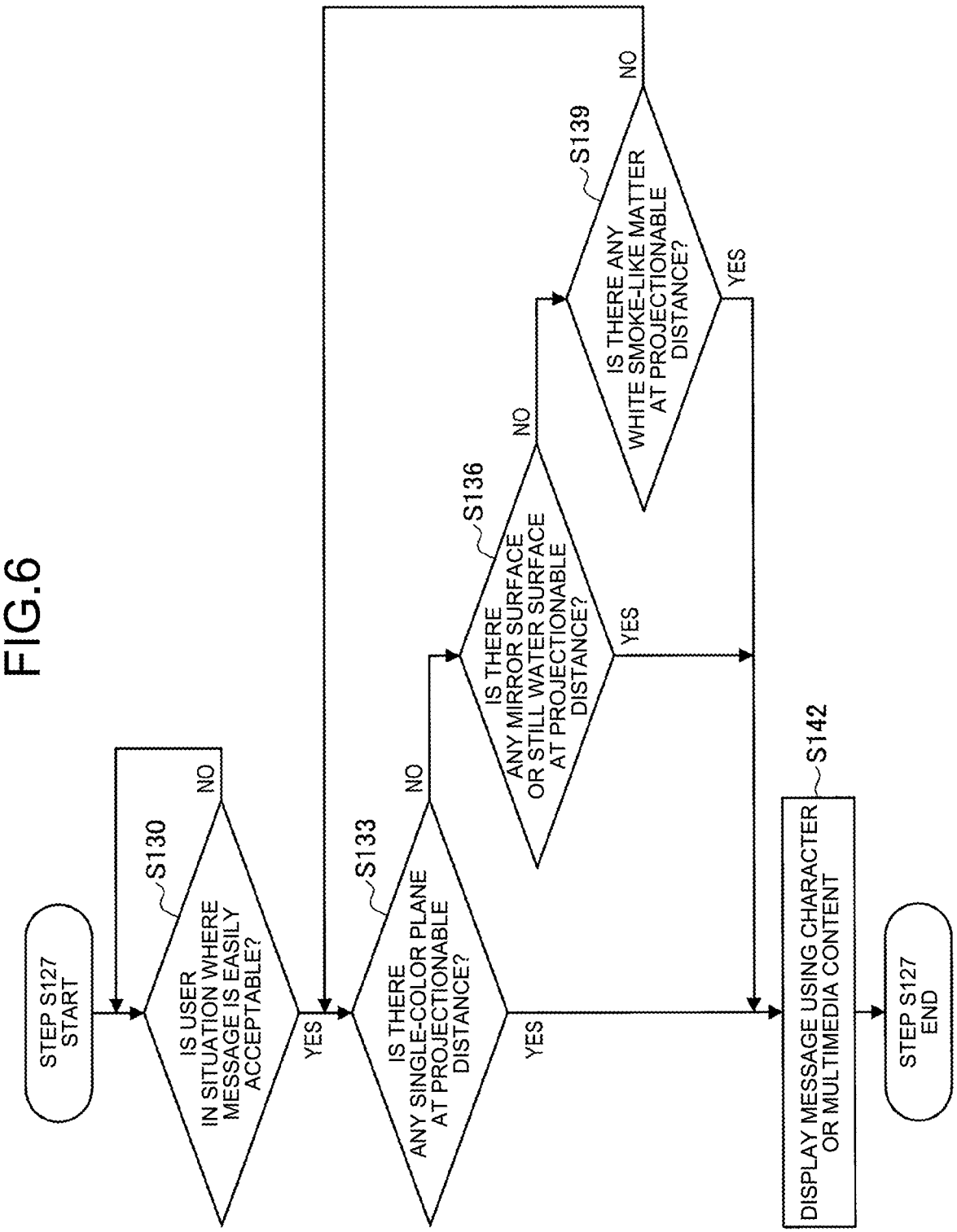
FIG. 6 is a flow chart illustrating an example of a flow of output control processing for a message, according to First Example.

As illustrated in FIG. 6, if a user is in a situation where a message is easily acceptable (Step S130/Yes), the control unit 100 in the output device 1 determines, based on sensing data of the sensor 122, whether or not there is a single-color plane at a distance where projection by the projector 131 is possible (Step S133). Specifically, the control unit 100 analyzes a camera image and distance measurement data acquired by the sensor 122, and determines whether or not there is an object (a plane having a single color herein) having a shape that is able to be used for projection, at a distance where projection from the projector 131 is possible.

Or, the control unit 100 analyzes a camera image and distance measurement data similarly, and determines whether or not there is a mirror surface, a still water surface, or white smoke-like matter, at a distance where projection from by the projector 131 is possible (Steps S136 and S139).

Subsequently, if there is a single-color plane, a mirror surface, a still water surface, or white smoke-like matter, at a distance where protection by the projector 131 is possible (Step S133/Yes, Step S136/Yes, or Step S139/Yes), the control unit 100 displays (projects) a message by means of the projector 131 using a character (an agent image) or multimedia content (message text, a moving image, a still image, or the like) (Step S142). Furthermore, the control unit 100 may output, together with the display of the agent image, voice data (agent voice data) of the message as multimedia content, from the speaker 132.

As described above, when a message is presented using the projector 131, the output device 1 determines, as appropriate, an appropriate protection place from the surroundings of a user (a projection place satisfying a given condition), and performs control such that the message is projected onto the projection place (by controlling driving of the projector 131). As a result, in various scenes in daily life, a message is able to be presented anywhere when a user is in a situation where a message is easily acceptable.

Recognition Processing for User Situation

Next, details of recognition processing for a user situation, represented by above mentioned Steps S112 to S121 illustrated in FIG. 5 will be described below by reference to FIG. 7.

Figure 7:
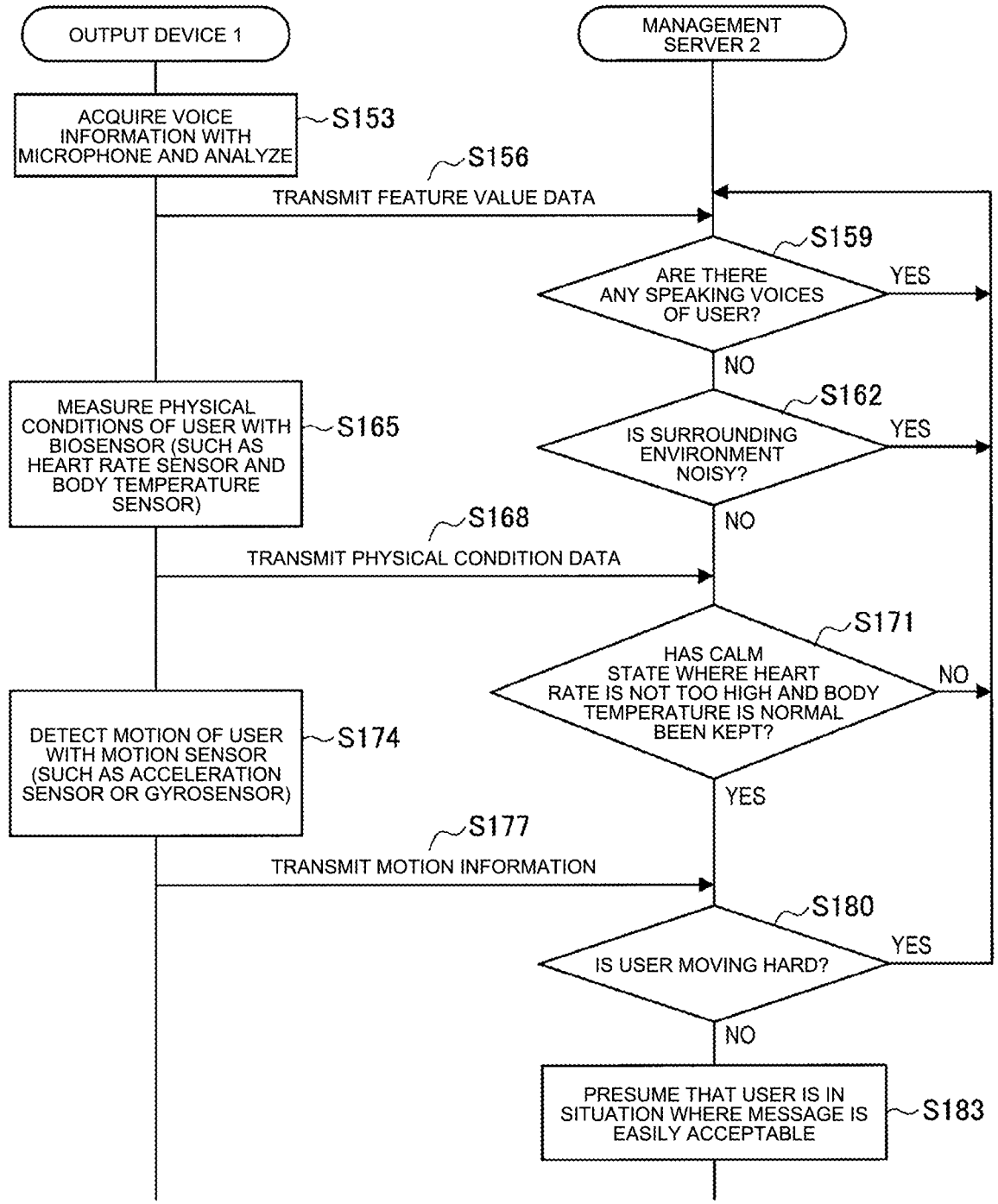
FIG. 7 is a sequence diagram illustrating an example of a flow of recognition processing for a user situation, based on sensing data, according to First Example.

FIG. 7 is a sequence diagram illustrating an example of a flow of the recognition processing for a user situation, based on sensing data, according to First Example. As illustrated in FIG. 7, firstly, the output device 1 acquires voice information through a mike, analyzes voice data (Step S153), and transmits a result of the analysis (feature value data) to the management server 2 (Step S156).

Subsequently, based on the analysis result, the situation recognition unit 202 of the management server 2 determines whether or not there are any speaking voices of the user (Step S159) and whether or not an environment surrounding the user is noisy (Step S162).

Furthermore, the output device 1 measures physical conditions of the user with a biosensor (such as a heart rate sensor and a body temperature sensor) (Step S165), and transmits results of the measurement (physical condition data) to the management server 2 (Step S168).

Subsequently, the situation recognition unit 202 of the management server 2 determines, based on the measurement results, whether or not a calm state where the user's heart rate is not too high and the user's body temperature is normal has been kept (Step S171). Specifically, the situation recognition unit 202 determines whether or not the user's heart rate has not exceeded a predetermined value and the user's body temperature is normal.

Furthermore, the output device 1 detects motion of the user with a motion sensor (an acceleration sensor, a gyrosensor, or the like) (Step S174), and transmits a result of the detection (motion information) to the management server 2 (Step S177).

Subsequently, the situation recognition unit 202 of the management server 2 determines, based on the detection result, whether or not the user is moving hard (Step S180). Whether or not the user is moving hard may be, for example, determined from feature values acquired by analysis of acceleration data and the like, or determined by comparison with a predetermined threshold.

The situation recognition unit 202 of the management server 2 then presumes that the user is in a situation where a message is easily acceptable (Step S183), if there are no speaking voices of the user (Step S159/No), the environment surrounding the user is not noisy (Step S162/No), the calm state where the user's heart rate is not too high and the user's body temperature is normal is being kept (Step S171/Yes), and the user is not moving hard (Step S180/No).

An example of the recognition processing for a user situation according to First Example has been described above. The example enables a message to be presented when a user is in a situation where the user is able to accept a message easily, and enables the message to be presented more effectively. For a message that is from a master system and (indirectly) prompts change in behavior, the user is more preferably in a situation where a message is easily acceptable. The message presented by the master system may, for example, let a father who does not help with the housework and parenting know the state of his wife struggling alone or the state of a crying infant (by projection of a camera image of a parenting state, for example). Presentation of such a message at a time when, for example, a user (a father) is soaking himself in a bathtub and feeling easy is more expected to let the father feel like helping with the housework and parenting naturally (that is, to accept the message and be caused to spontaneously change his behavior). Furthermore, presentation of a notification of the fact that colleagues are not very happy about a user's messy desk at the office (for example, by projection of a camera image of how people are looking dubiously at the messy desk) is more expected to make the user feel like tidying up the desk naturally (that is, to cause the user to accept the message and spontaneously change his behavior).

The determination standards illustrated in FIG. 7 are just an example, and First Example is not limited to this example.

Furthermore, the order of Steps S153 to S162 (determination processing based on voice data), Steps S165 to S171 (determination processing based on biological data), and Steps S174 to S180 (determination processing based on motion data), which is illustrated in FIG. 7, is not limited to the order illustrated in FIG. 7, and the sets of steps may be performed in parallel with one another or in different order.

3-2. Second Example (Presentation According to Message Content and User State)

Second Example of the embodiment will be described next. In Second Example, in addition to the timing according to a user situation described with respect to First Example, presentation of a message when a user state matches the content of a message presented by comparison of the content of the message with the user state enables the effect of the presentation of the message to be enhanced further. That is, even if the user is in a situation where a message is easily acceptable, if the content of the message does not match the state of the user (such as physical conditions or emotions), presentation of the message is not performed.

For example, if the content of the message includes a keyword related to movement or moving the body, such as exercise or outing, the message is desirably presented when the user is in a state where the user's physical conditions are well and the user is full of energy. On the contrary, if the content of the message includes a keyword related to conserving physical strength, such as having a rest or going home, the message is desirably presented when the user is in a state where the user's physical conditions are not well and the user is tired. Therefore, a message that recommends exercise, for example is not presented when a user is tired, in consideration of physical conditions of the user.

Operation and processing according to Second Example will be described specifically below by reference to FIG. 8 and FIG. 9.

Figure 8:
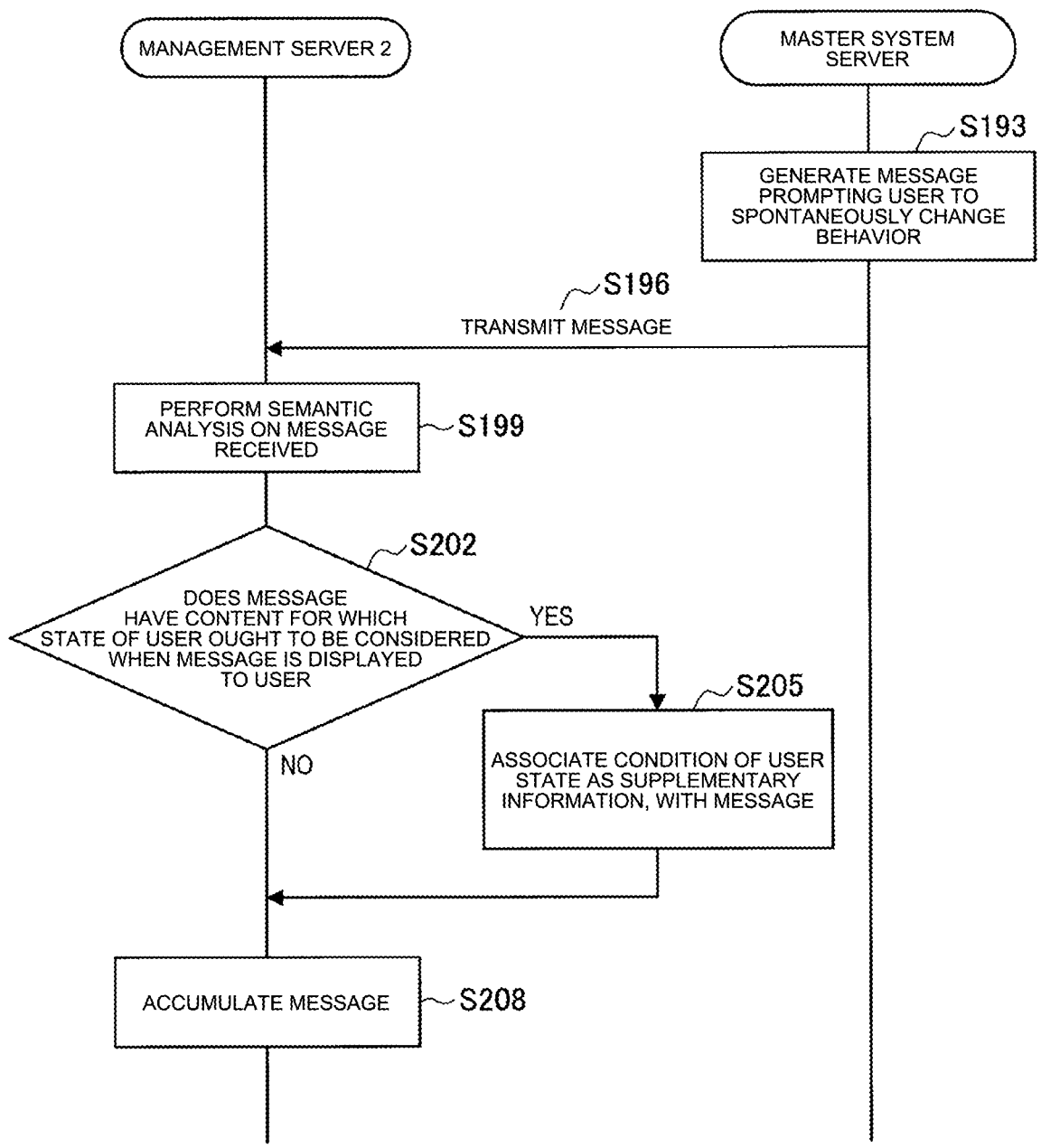
FIG. 8 is a sequence diagram illustrating an example of a flow of accumulation processing for messages, according to Second Example.

FIG. 8 is a sequence diagram illustrating an example of a flow of accumulation processing for messages, according to Second Example. As illustrated in FIG. 8, firstly, a master system server generates a message that prompts a user to spontaneously change his behavior (Step S193), and transmits the message to the management server 2 (Step S196). The message that prompts the user to spontaneously change his behavior and is presented by the master system is described herein as an example of a message, but without being limited to this example, according to Second Example, the message may be a response message presented by a general agent system, information presented from any information presentation system, or the like.

Subsequently, the message management unit 203 of the management server 2 performs semantic analysis on the message received from the master system server (Step S199).

Subsequently, the message management unit 203 of the management server 2 determines whether or not the message has content for which a state of the user ought to be considered when the message is displayed to the user (Step S202). For example, if the message includes a predetermined keyword related to a state of the user (for example, a keyword related to something requiring physical strength, such as "exercise", or a keyword related to conservation of physical strength, such as "having a rest"), the message management unit 203 determines that the message has content for which a state of the user ought to be considered.

Subsequently, if it has been determined that the message has content for which a state of the user ought to be considered (Step S202/Yes), the message management unit 203 associates a condition of a user state matching the content of the message, with the message, the condition serving as supplementary information (Step S205). The condition of a user state may be, for example, "the physical conditions being well/unwell", "being energetic/non-energetic", or "being well/tired".

The message management unit 203 then accumulates the message received, into the storage unit 220 (Step S208).

As described above, when the message management unit 203 of the management server 2 acquires a message addressed to a user from a system, the message management unit 203 performs semantic analysis on the content of the message, and for a message for which a user state ought to be considered, the message management unit 203 is able to accumulate the message beforehand in association with supplementary information that is a condition of the user state.

Such accumulation processing for messages may be performed continuously. Operation and processing when a message that has been accumulated is presented to a user from the output device 1 will be described next by reference to FIG. 9.

Figure 9:
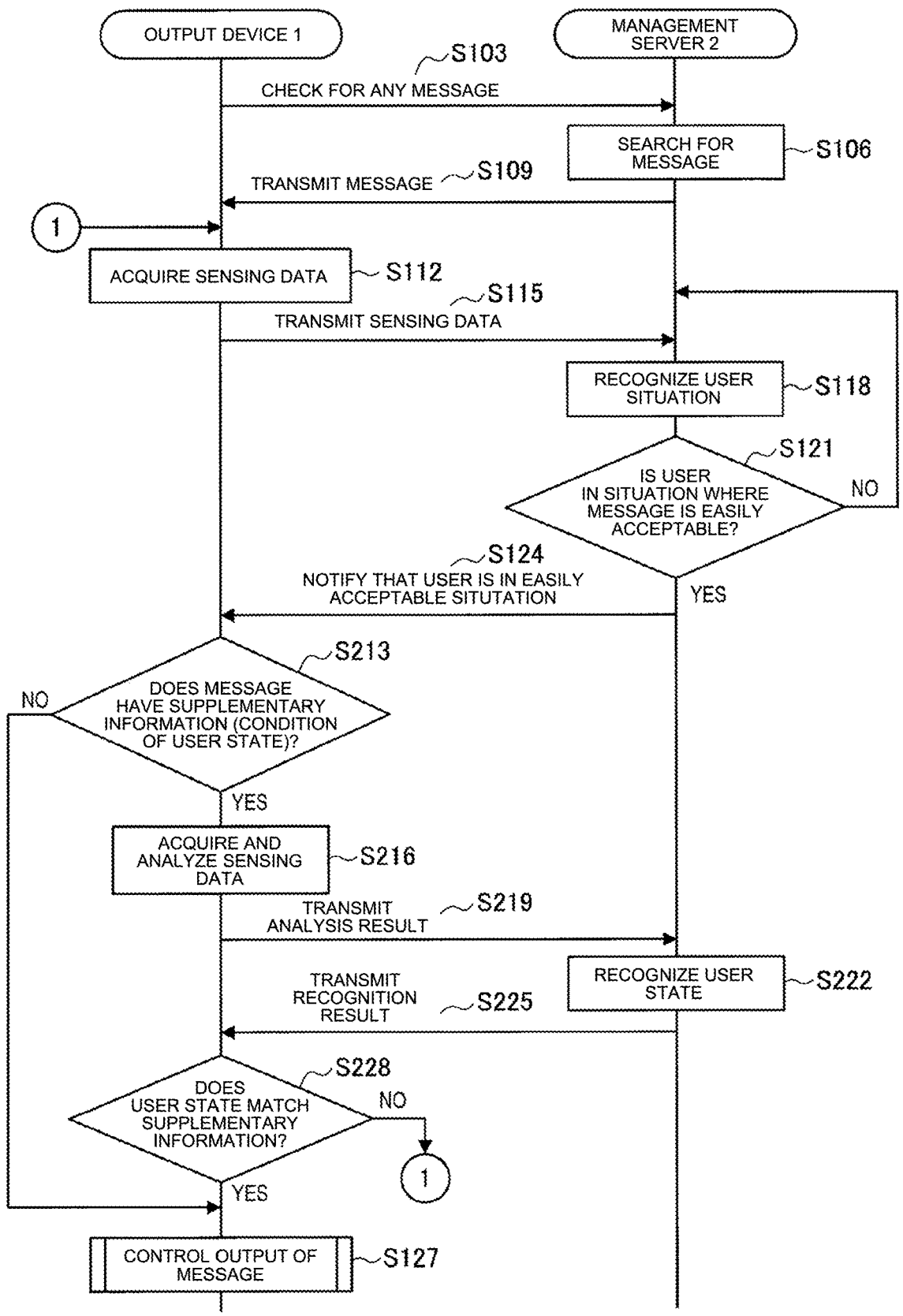
FIG. 9 is a sequence diagram illustrating an example of a flow of message presentation processing according to Second Example.

FIG. 9 is a sequence diagram illustrating an example of a flow of message presentation processing according to Second Example. Processing at Steps S103 to S124 illustrated in FIG. 9 is the same as the processing of the same reference signs described by reference to FIG. 5 with respect to First Example. That is, if there is a message to be presented to a user, processing for presumption of whether or not a current user situation is a situation where a message is easily acceptable is performed.

Subsequently, in Second Example, the output device 1 checks whether or not the message transmitted from the management server 2 at Step S109 described above has supplementary information (a condition of a user state) associated therewith (Step S213), although in First Example, output control processing for a message is performed when a notification is received from the management server 2, the notification being of the fact that a user is in a situation where a message is easily acceptable.

Subsequently, if supplementary information has been associated therewith (Step S213/Yes), the output device 1 analyzes sensing data acquired from the sensor 122 (Step S216) and transmits results of the analysis to the management server 2 (Step S219).

Subsequently, the situation recognition unit 202 of the management server 2 performs recognition of a user state, based on the results of the analysis on the sensing data (Step S222) and a result of the recognition is transmitted to the output device 1 (Step S225). Recognizing a user state may be, for example, recognizing that "the physical conditions are well" when the body temperature is normal, there is no sighing, the voice is loud, and/or the user is smiling, or recognizing that "the physical conditions are unwell" when the body temperature is higher than the normal temperature, the number of sighs is larger than a predetermined value, the voice is small, the user is silent, and/or the user does not smile.

Subsequently, the output device 1 determines whether or not the user state indicated by the recognition result from the management server 2 matches the supplementary information (the condition of a user state) that has been associated with the message (Step S228). The condition of a user state that is the supplementary information may be, for example, as described above, "the physical conditions being well/unwell", "being energetic/non-energetic", or "being well/tired", and the output device 1 determines whether or not the current state of the user matches that condition.

If the state of the user matches the supplementary information (Step S228/Yes), the output device 1 performs output control for the message to the user (Step S127). Details of the output control for the message is the same as that in First Example (see FIG. 6).

If no supplementary information has been associated with the message at Step S213 described above (Step S213/No), without consideration of any match between the state of the user and the content, output control for the message to the user may be performed (Step S127).

As a result, a message is able to be presented when a user is in a situation where a message is easily acceptable and the content of the message to be presented matches the state of the user.

Furthermore, the output device 1 may present a message having content matching a state of a user, among plural messages received from the management server 2. For example, in a case where behavior changing messages for increasing the time for a family get-together include a message, "Why don't you go to a batting cage and have a moderate exercise there?" and a message, "Let's go home early.", if a user's physical conditions are unwell and the user is exhausted, the latter message may be presented and if the user's physical conditions are well and the user is full of energy, the former message may be presented. The former message from the master system and recommending an exercise enables the user to obtain time for a family get-together by: causing the user to relieve stress by exercise; reducing the amount of alcohol intake dependent on the amount of stress on the user; thereby improving the quality of the user's sleep; making the wake-up time dependent on the hours of sleep early; and making the user have breakfast with his family. Furthermore, the latter message from the master system enables the user to obtain time for a family get-together by: causing the user to go home early; thereby making his life rhythm match that of the other family members; and causing the user to have dinner with the family.

3-3. Third Example (Change of User Situation)

Third Example of the embodiment will be described next. In Third Example, when a user is in a situation where it is difficult for the user to accept a message, a control guide (hereinafter, also referred to as guide content) that changes the situation of the user to a situation where a message is easily acceptable is presented. As a result, chance that a message is able to be presented in a situation where a message is easily acceptable is able to be increased.

Furthermore, if content of the message does not match a user state, some guide content that changes the state of the user to a state matching the content of the message is presented. As a result, chance that the message having the content matching the state of the user is able to be presented is able to be increased.

Figure 10:
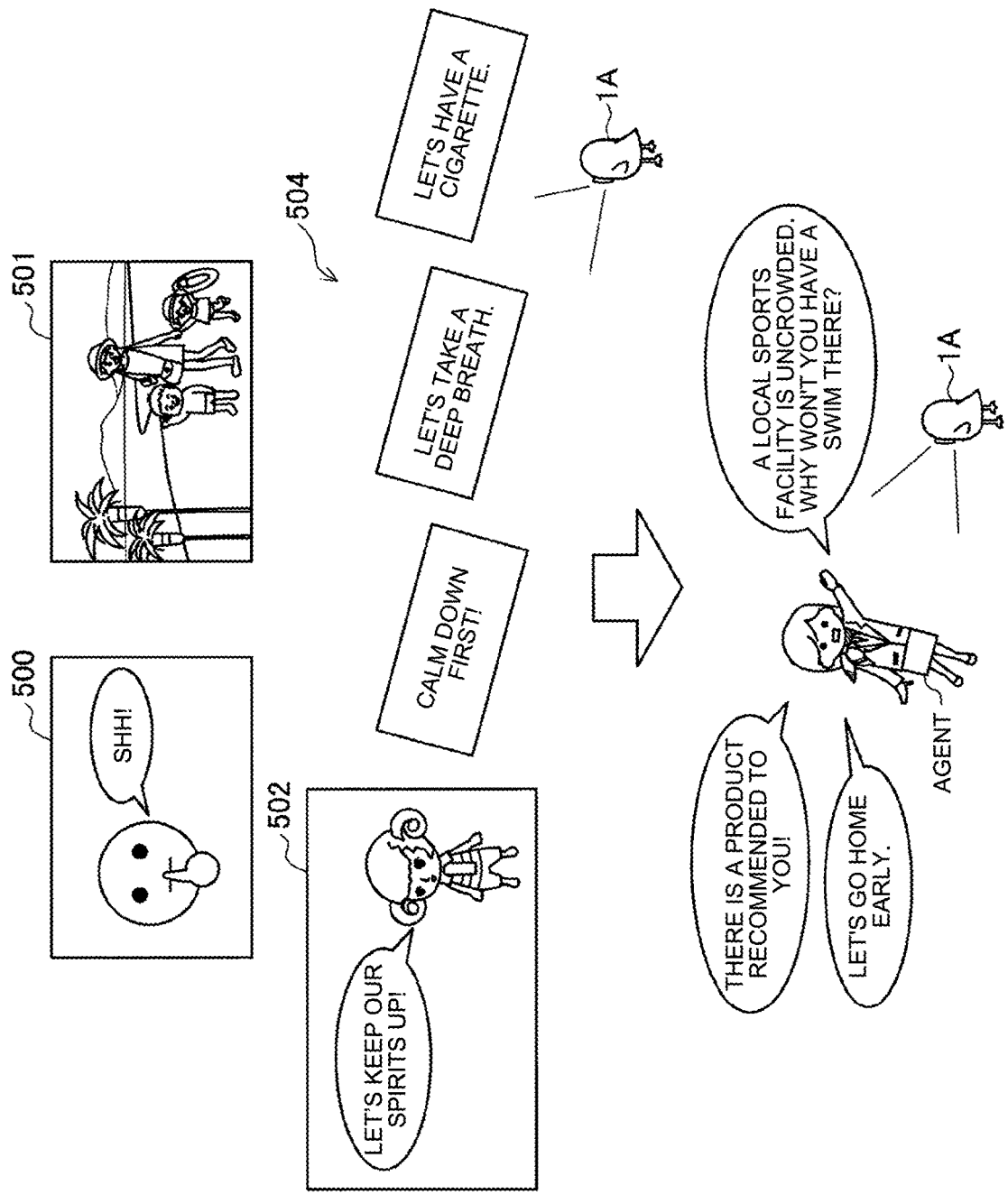
FIG. 10 is a diagram illustrating an example of guide content that changes a user's situation, according to Third Example.

Examples of the guide content that changes a situation or state of a user are illustrated in FIG. 10, for example. FIG. 10 is a diagram illustrating an example of the guide content that changes a user's situation, according to Third Example.

As illustrated in FIG. 10, for example, if a user is having a conversation, a guide display image 500 requesting the user to be quiet may be presented (projected by the output device 1) to guide the user to be in a quiet situation where a message is easily acceptable. Furthermore, if a user is in a state of being tired and unwell, a photographic image 501 of the user's children or family, or an image 502 or the like having the user's favorite character cheering up the user may be presented to more effectively present the message having the content matching the well state. Furthermore, if a user is excited, in a hurry, or in a panic, a direct message 504 or the like, such as "Calm down!" or "Let's take a deep breath.", may be presented to guide the user to be in a calm situation where a message is easily acceptable.

Such operation and processing in Third Example will be described by reference to FIG. 11 to FIG. 13.

Figure 11:
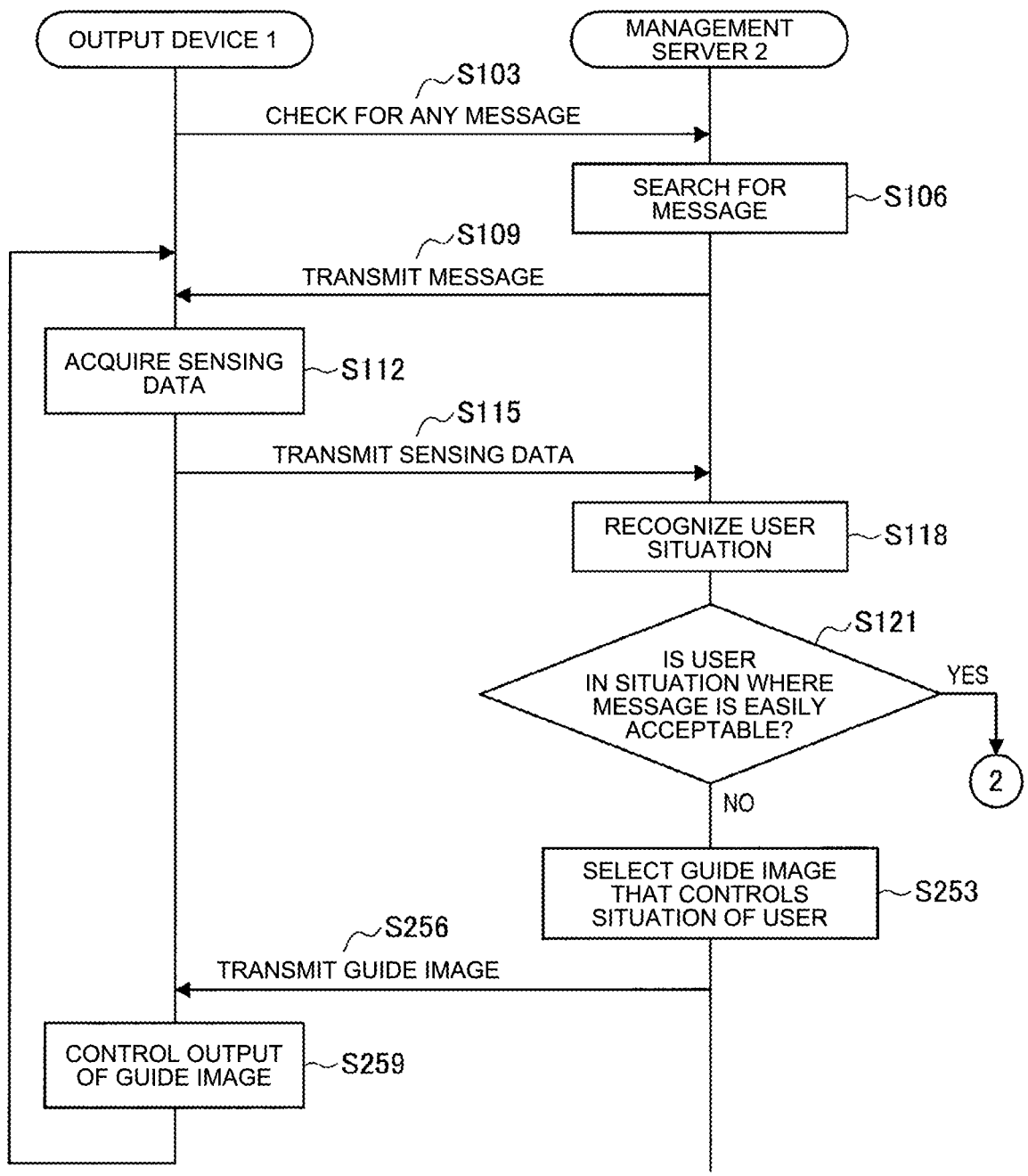
FIG. 11 is a sequence diagram illustrating an example of a flow of message presentation processing according to Third Example.
Figure 12:
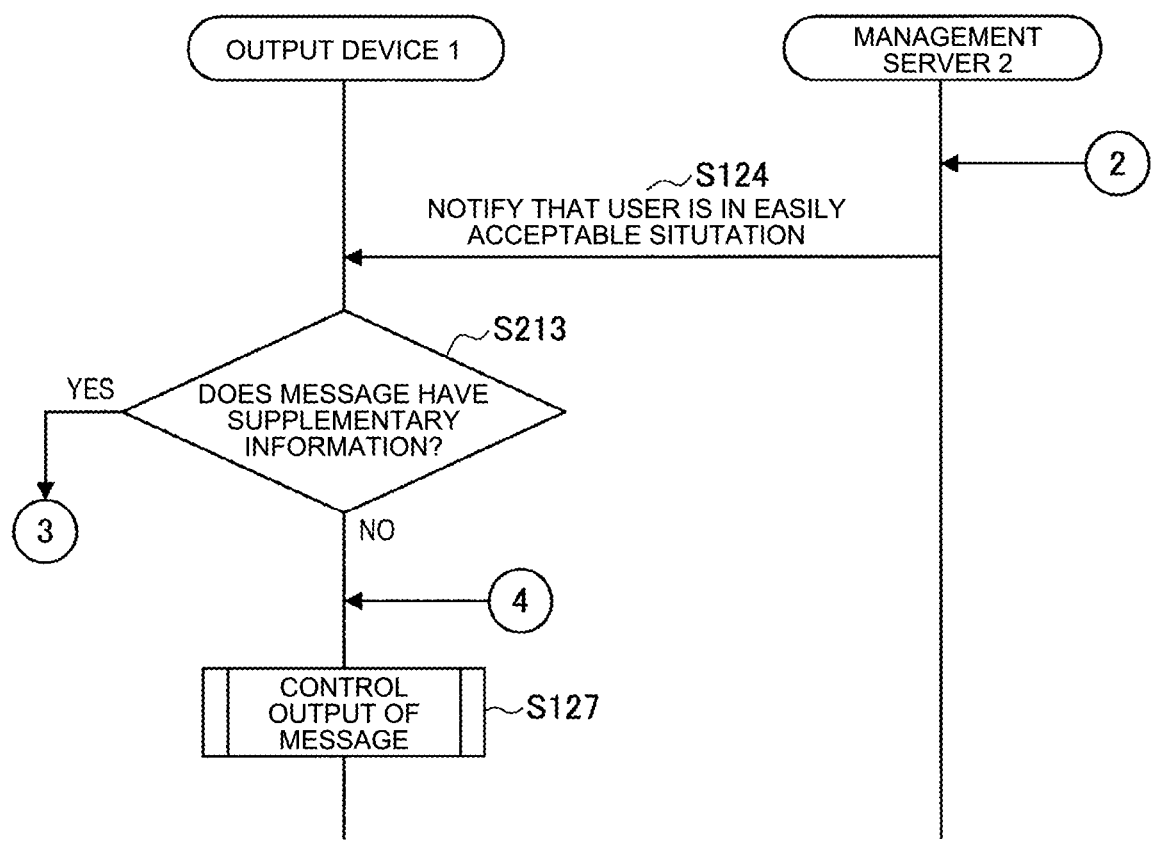
FIG. 12 is a sequence diagram illustrating the example of the flow of the message presentation processing according to Third Example.
Figure 13:
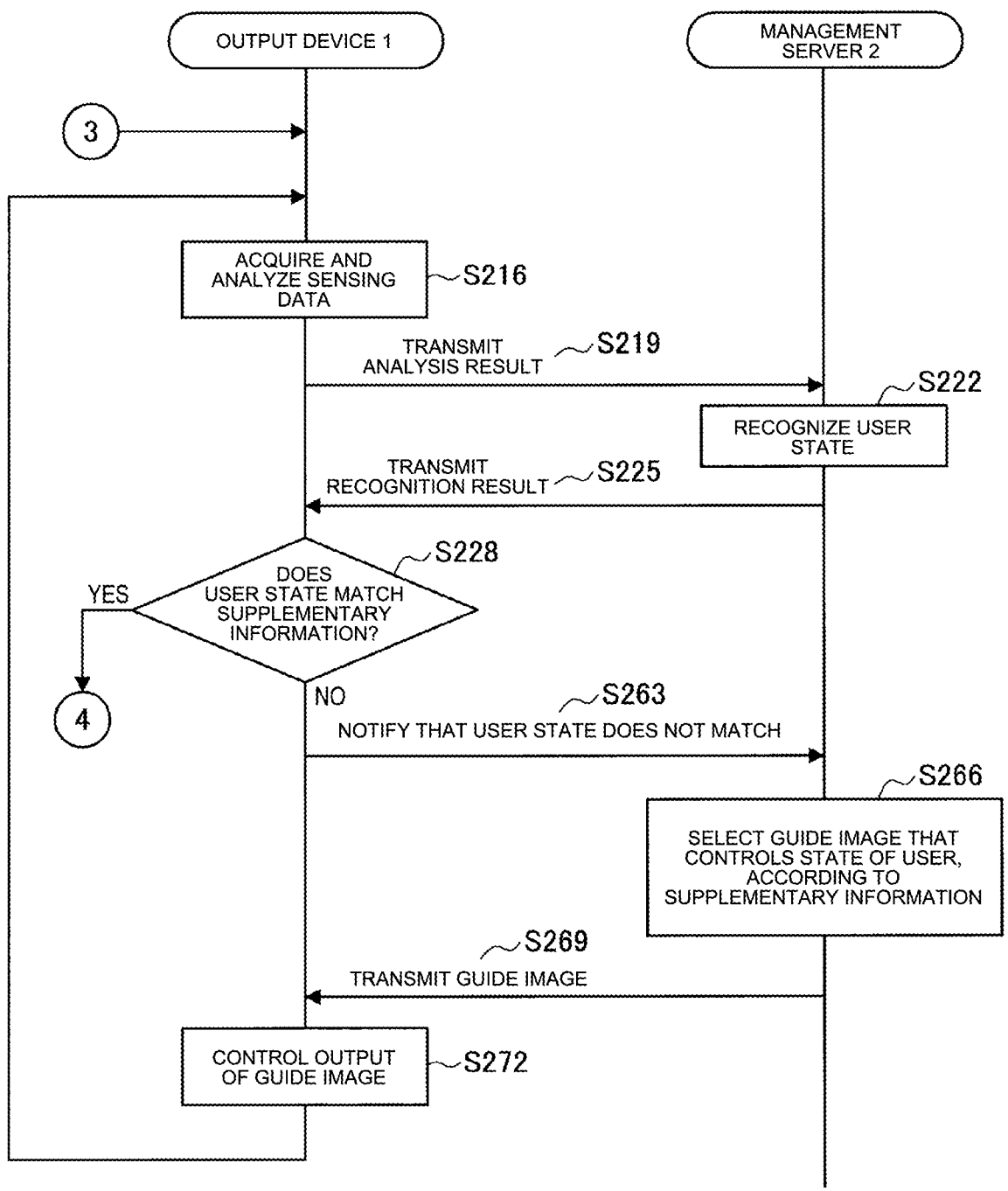
FIG. 13 is a sequence diagram illustrating the example of the flow of the message presentation processing according to Third Example.

FIG. 11 to FIG. 13 are sequence diagrams illustrating an example of a flow of message presentation processing according to Third Example.

Processing at Steps S103 to S121 illustrated in FIG. 11 is the same as the processing of the same reference signs described by reference to FIG. 5 with respect to First Example. That is, if there is a message to be presented to a user, processing for presumption of whether or not a current user situation is a situation where a message is easily acceptable is performed.

Subsequently, if it has been presumed that the user is not in a situation where a message is easily acceptable (Step S121/No), the management server 2 selects a guide image that controls the user's situation (that is, changes the user's situation to a situation where a message is easily acceptable) (Step S253) and transmits the guide image to the output device 1 (Step S256). Guide images have been accumulated in, for example, the storage unit 220 beforehand, and the management server 2 selects the appropriate guide image, based on the current user situation.

Subsequently, the output device 1 controls output of the received guide image (Step S259). In the control of output of the guide image, for example, the guide image is projected onto a surrounding appropriate projection place by means of the projector 131. The output control processing for a message described by reference to FIG. 6 with respect to First Example is applicable as to details of projection control for the guide image. That is, if there is a single-color plane, a mirror surface, a still water surface, white smoke-like matter, or the like, at a projectionable distance, the output device 1 projects the guide image onto that place.

Presentation of the guide image is expected to change the user's situation to a situation where a message is easily acceptable. After the guide image has been presented, as illustrated in FIG. 11, the above described processing from Step S112 is repeated again.

On the contrary, if it has been presumed that the user is in a situation where a message is easily acceptable (Step S121/Yes), the management server 2 notifies the output device 1 of the fact that the user is in a situation where a message is easily acceptable, as illustrated in FIG. 12 (Step S124).

Subsequently, the output device 1 checks whether or not supplementary information (a condition of the user state) has been associated with the message transmitted from the management server 2 (Step S213), and if no supplementary information has been associated therewith (Step S213/No), the output device 1 performs output control for the message to the user (Step S127). The processing at Steps S124, S213, and S127 is the same as the processing of the same reference signs described by reference to FIG. 9 with respect to Second Example.

Subsequently, if supplementary information has been associated with the message transmitted from the management server 2 (Step S213/Yes), as illustrated in FIG. 13, the output device 1 acquires sensing data and transmits the sensing data to the management server 2 (Steps S216 and S219) and acquires a result of recognition of the user's state from the management server 2 (Steps S222 and S225).

Subsequently, the output device 1 determines whether or not the user state indicated by the recognition result from the management server 2 matches the supplementary information (the condition of the user state) that has been associated with the message (Step S228). The above described processing at Steps S216 to S228 is the same as the processing of the same reference signs illustrated in FIG. 9 described with respect to Second Example.

Subsequently, if the user state does not match the supplementary information of the message (the condition of the user state) (Step S228/No), the output device 1 notifies the management server 2 of the fact that the user state does not match therewith (Step S263).

Subsequently, according to the supplementary information, the management server 2 selects a guide image that controls (changes) the user's state (such as emotions) to match the condition of the user state indicated by the supplementary information (Step S266), and transmits the guide image to the output device (Step S269).

The output device 1 then performs output control for the received guide image (Step S272). In the output control for the guide image, for example, the guide image is projected onto an appropriate surrounding projection place by means of the projector 131. The output control processing for a message described by reference to FIG. 6 with respect to First Example is applicable as to details of projection control for the guide image. That is, if there is a single-color plane, a mirror surface, a still water surface, white smoke-like matter, or the like, at a projectionable distance, the output device 1 projects the guide image onto that place.

Presentation of the guide image is expected to change the user state to a state matching the message content. After the guide image has been presented, as illustrated in FIG. 13, the above described processing from Step S216 is repeated again.

If the user state matches the supplementary information of the message (the condition of the user state) (Step S228/Yes), the output device 1 performs output control for the message to the user (Step S127 in FIG. 12).

3-4. Fourth Example (Presentation at Place Visually Recognizable by User)

Fourth Example of the embodiment will be described next. In each of above described First to Third Examples, when a message or a guide image is presented to a user, display of the message or guide image is enabled anywhere in various scenes of daily life by suitable projection onto an appropriate projection place surrounding the user by means of the projector 131, for example. Even if the projection place (projection target) is an appropriate place (object), the projection place may actually be a place difficult to be visually recognized by the user if the projection place is behind the user, the user is looking at a different place, or the focus is not thereon.

Figure 14:
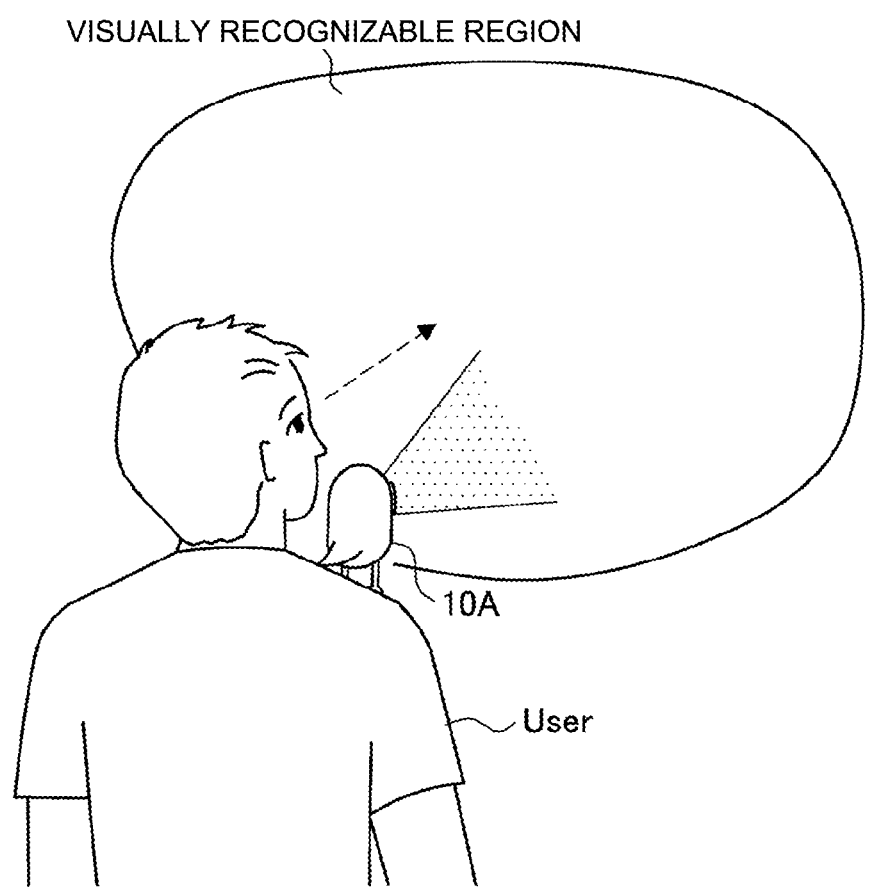
FIG. 14 is a diagram for explanation of projection control for a place visually recognizable easily by a user, according to Fourth Example.

Therefore, in Fourth Example, as illustrated in FIG. 14, when there is an appropriate projection place in a visually recognizable region determined based on a user's head or face orientation, line of sight, or the like, controlling so that a message or a guide image to the user is projected onto the projection place enables the message to be presented to the user more infallibly in various scenes of daily life. For example, the output device 1 may perform projection control according to whether or not the user's line of sight is directed to the projection place, or perform projection control according to whether or not the user's focus is on the projection place.

Such projection control according to Fourth Example will be described below by reference to FIG. 15.

Figure 15:
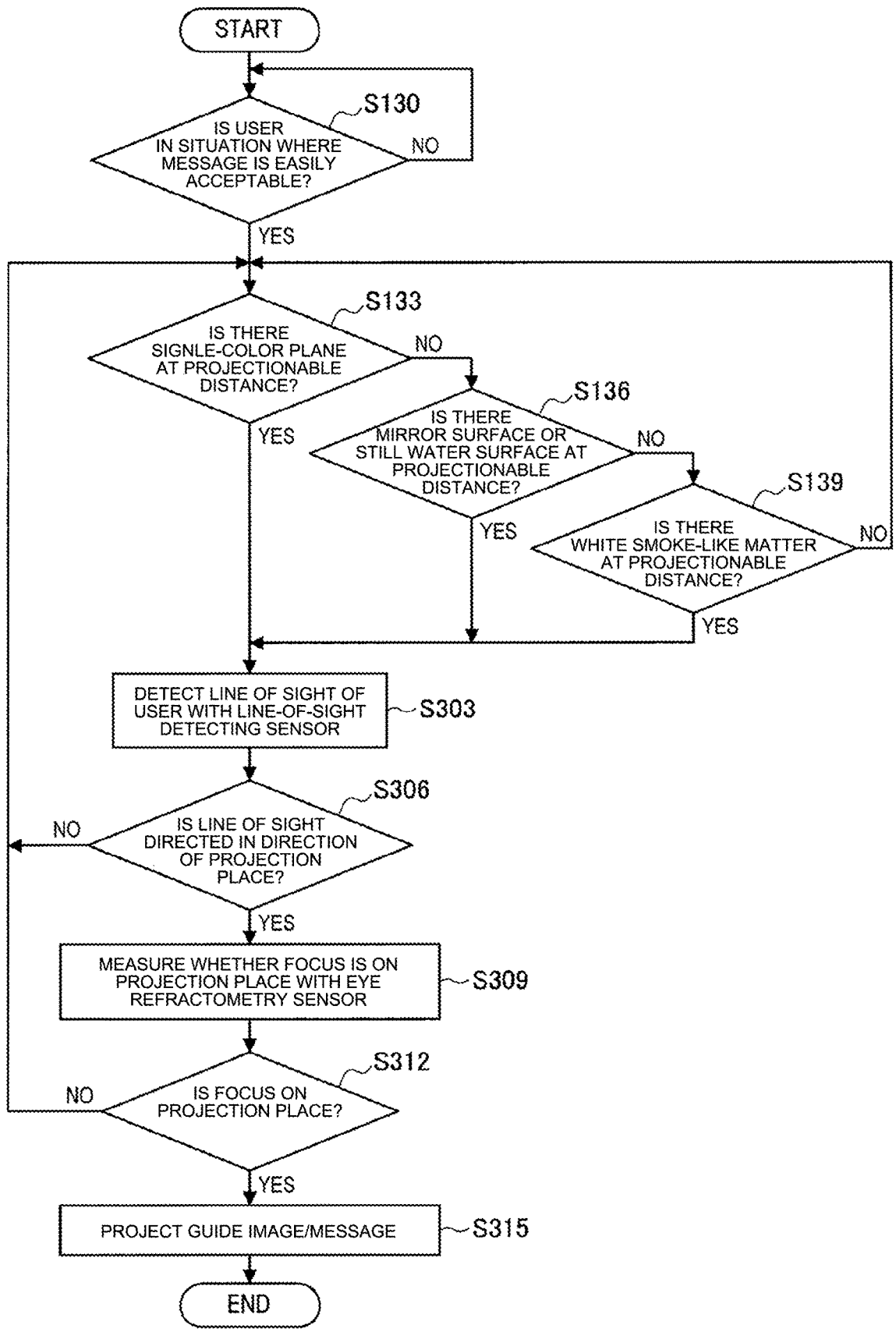
FIG. 15 is a flow chart illustrating an example of a flow of projection control processing according to Fourth Example.

FIG. 15 is a flow chart illustrating an example of a flow of projection control processing according to Fourth Example. Processing at Steps S130 to S139 in FIG. 15 is the same as the processing of the same reference signs illustrated in FIG. 6 described with respect to First Example. That is, when displaying a message in a case where a user is in a situation where a message is easily acceptable, the output device 1 performs processing of determining an appropriate projection place around the user (for example, a single-color plane, a mirror surface, a still water surface, white smoke-like matter, or the like that is at a projectionable distance).

Subsequently, the output device 1 detects a line of sight of the user with a line-of-sight detecting sensor (Step S303) and determines whether or not the line of sight of the user is directed in the direction of the appropriate projection place determined at Steps S133 to S139 described above (Step S306). The line-of-sight detecting sensor is an example of the sensor 122, and a method of detecting a line of sight used may be, for example, a method in which detection is performed based on a detection result from an ocular potential sensor, a method in which detection is performed by emission of infrared (IR) light to eyeballs and detection of reflected light therefrom (a corneal reflex method, a sclera reflection method, or the like), or a method in which detection is performed based on positions of reference points of the eyes (such as inner corners of the eyes or corneal reflection) and moving points of the eyes (such as irises or pupils) using a visible light camera. Furthermore, based on a camera video having captured therein the user's face or sensing data of a motion sensor, the output device 1 may determine the user's face orientation or head direction, and regard the user's face orientation or head direction as a line-of-sight direction.

Subsequently, if the user's line of sight is directed in the direction of the projection place (Step S306/Yes), the output device 1 measures whether or not the user's focus is on the projection place (that is, whether an image has been formed in front of the retinas) by means of, for example, an eye refractometry sensor (such as an autorefkeratometer) (Step S309).

Subsequently, if the focus is on the projection place (Step S312/Yes), the output device 1 performs projection of a message or a guide image (Step S315).

The output device 1 may determine plural appropriate projection places and select a place that is easily recognized visually by a user from these projection places. Furthermore, in the flow chart illustrated in FIG. 15, whether or not the projection place is a place easily recognized visually by the user is determined based on the line-of-sight direction and the focus, but Fourth Example is not limited to this determination. For example, the determination may be performed using either one of the line-of-sight direction and the focus, or the determination may be performed based on another factor (such as whether the projection place is in front of the user, whether the projection place is in the direction of travel, whether the projection place is in the range of the view, or whether the projection place is predicted to be a place where the line of sight will be directed immediately).

3-5. Fifth Example (Learning "Situation Where Message is Easily Acceptable")

Fifth Example of the embodiment will be described lastly. Whether or not a user is in a situation where a message is easily acceptable may be determined by comparison of sensing data with a predetermined standard (a predetermined standard set beforehand), the sensing data having been acquired from any of various sensors, such as a mike, a camera, a biosensor, and a motion sensor, but the determination standard may change depending on the environment or the like surrounding the user, and accurate determination may not be enabled just by use of a given rule that has been determined beforehand.

Therefore, in Fifth Example, based on a reaction (feedback) of a user after a message has been presented, whether or not the user was in "a situation where a message is easily acceptable" is learnt, and a situation is thus able to be determined even more accurately. For example, in a case where an agent image is projected and a message is output in voice, if a user looks at the agent and say a word or words of acceptance of the message, such as "Got it." or "Okay.", it may be learnt that the user was in "a situation where a message is easily acceptable". Furthermore, if a user's behavior after presentation of a message is observed and there is a change in the behavior after the presentation of the message from the behavior before the presentation of the message, it may be learnt that the user was in "a situation where a message is easily acceptable".

Such projection control according to Fifth Example will be described below by reference to FIG. 16 to FIG. 18.

Figure 16:
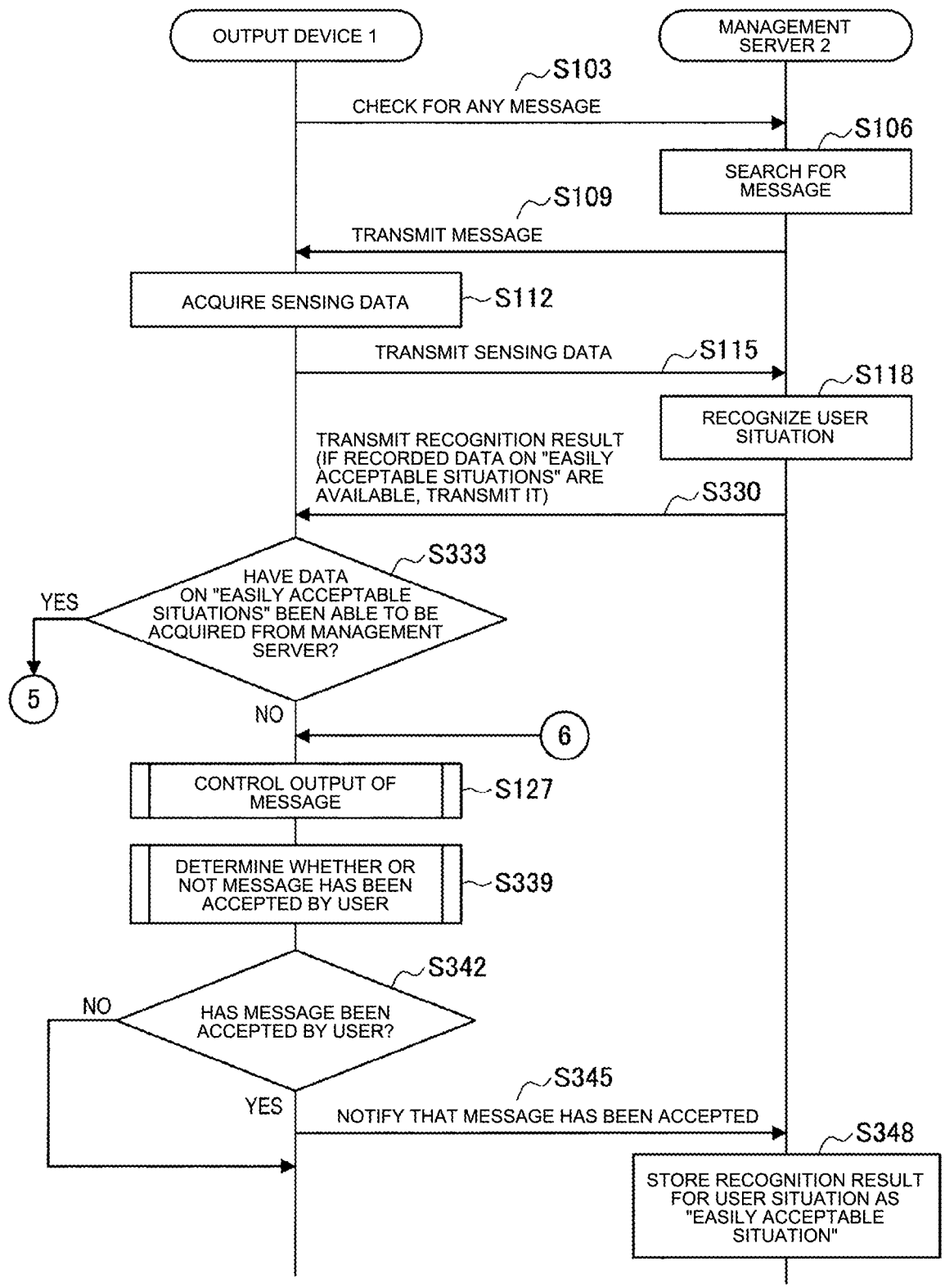
FIG. 16 is a sequence diagram illustrating an example of a flow of processing for learning about determination of any situation where a message is easily acceptable, according to Fifth Example.
Figure 17:
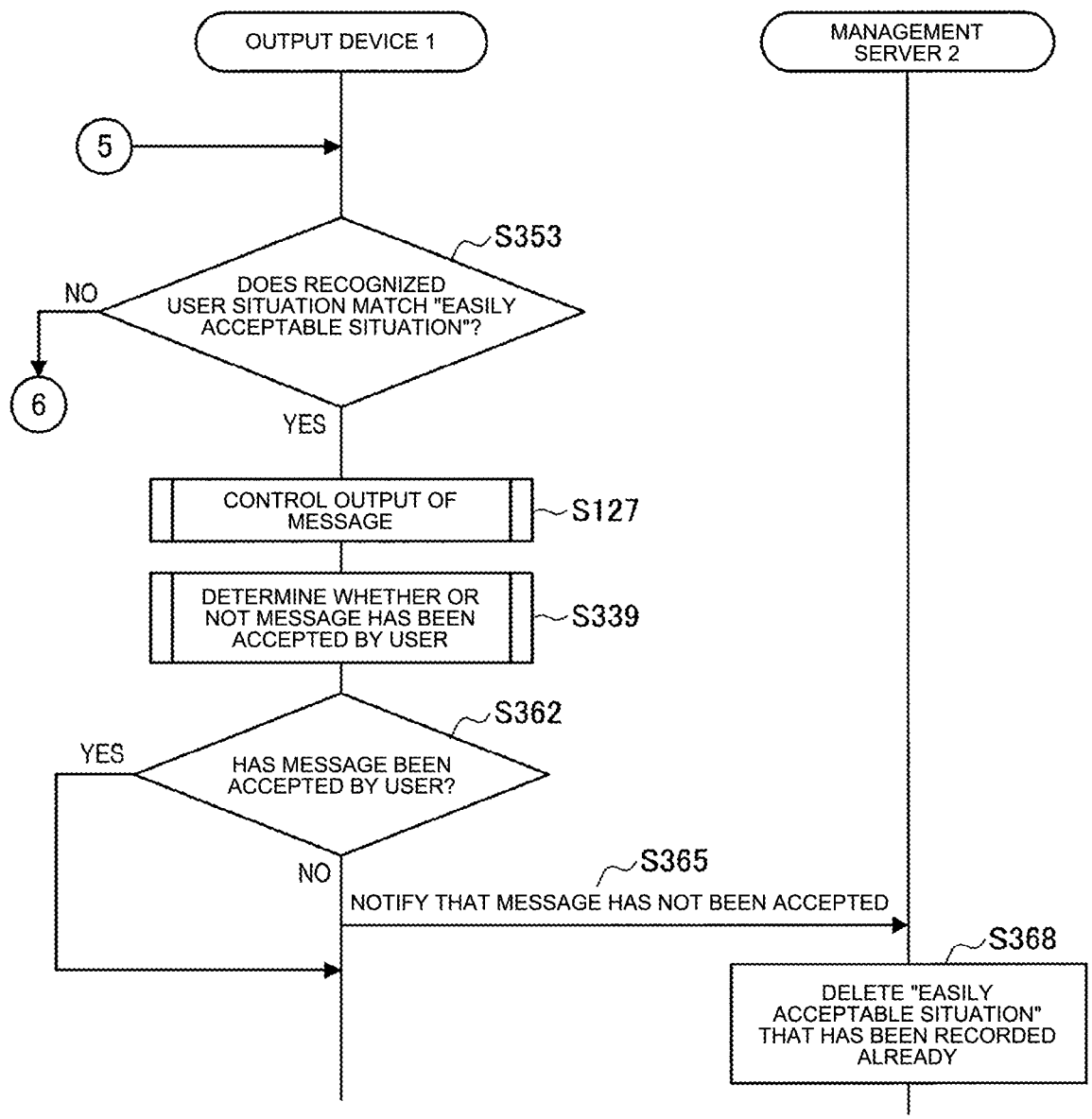
FIG. 17 is a sequence diagram illustrating the example of the flow of the processing for the learning about the determination of any situation where a message is easily acceptable, according to Fifth Example.

FIG. 16 and FIG. 17 are sequence diagrams illustrating an example of a flow of learning processing for determination of whether or not a user is in a situation where a message is easily acceptable, according to Fifth Example.

Processing at Steps S103 to S118 illustrated in FIG. 16 is the same as the processing of the same reference signs described by reference to FIG. 5 with respect to First Example. That is, if there is a message to be conveyed to a user, recognition of a user situation by the management server 2 is performed based on sensing data acquired at the output device 1.

Subsequently, the management server 2 transmits a result of the recognition of a user situation to the output device 1 (Step S330). If later described learning of user situation recognition has been performed already at the management server 2 and data on "easily acceptable situations" have been recorded already, the management server 2 transmits the data, together with the result of the recognition of the user situation, to the output device 1.

Subsequently, if data on "easily acceptable situations" have been unable to be acquired from the management server 2 (that is, if learning of "easily acceptable situations" has not been performed) (Step S333/No), the output device 1 performs output control for the message (Step S127). Details of the output control for the message are the same as that in First Example (see FIG. 6).

Subsequently, based on a reaction of the user after the message has been presented, the output device 1 determines whether or not the message has been accepted by the user (Step S339). Details of processing for this determination will be described later by reference to FIG. 18.

Subsequently, if it is determined that the message has been accepted by the user (Step S342/Yes), the output device 1 notifies the management server 2 of the fact that the message has been accepted (Step S345).

The management server 2 then stores the result of the recognition of the user situation at Step S118 described above as "an easily acceptable situation (of the user for a message)" (Step S348).

On the contrary, if it is determined that the message has not been accepted by the user (Step S342/No), the output device 1 does not notify the management server 2.

As described above, the management server 2 is able to learn about situations where a message is easily acceptable, for each user. As a result, for example, some people may be in a situation where a message is easily acceptable when they are moving hard, like when they are running on running machines at gyms, and easily acceptable situations that differ depending on people are thus able to be learnt.

If, at Step S333 described above, data on "easily acceptable situations" have been able to be acquired from the management server 2 (that is, learning for "easily acceptable situations" has been performed already) (Step S333/Yes), as illustrated in FIG. 17, the output device 1 determines whether or not the recognized user situation matches "an easily acceptable situation" (Step S353).

Subsequently, if the recognized user situation matches "an easily acceptable situation" (Step S353/Yes), the output device 1 performs output control for the message (Step S127). Details of the output control for the message are the same as that in First Example (see FIG. 6).

Subsequently, based on a reaction of the user after the message has been presented, the output device 1 determines whether or not the message has been accepted by the user (Step S339). Details of processing for this determination will be described later by reference to FIG. 18. In Fifth Example, a user's situation where a message is easily acceptable may have changed according to an environment or the like surrounding the user, and thus even if the user has been determined to be in a situation where a message is easily acceptable based on learning results and the message has been presented, the user's reaction thereafter is observed again and whether or not the message has been actually accepted is determined.

Subsequently, if it is determined that the message has not been accepted by the user (Step S362/No), the output device 1 notifies the management server 2 of the fact that the message has not been accepted (Step S365).

The management server 2 deletes the user situation this time (the situation where the message was not accepted) from the data on "easily acceptable situations" that have been recorded already (Step S368).

As a result, the case in which the situation where a message is easily acceptable changed is learnt, and "easily acceptable situations" will be able to be updated.

If the message has been accepted by the user (Step S362/Yes), the output device 1 does not notify the management server 2.

Determination Processing of Whether or Not Message Has Been Accepted

An example of determination processing of whether or not a message has been accepted, represented by Step S339 described above, will be described next by reference to FIG. 18.

Figure 18:
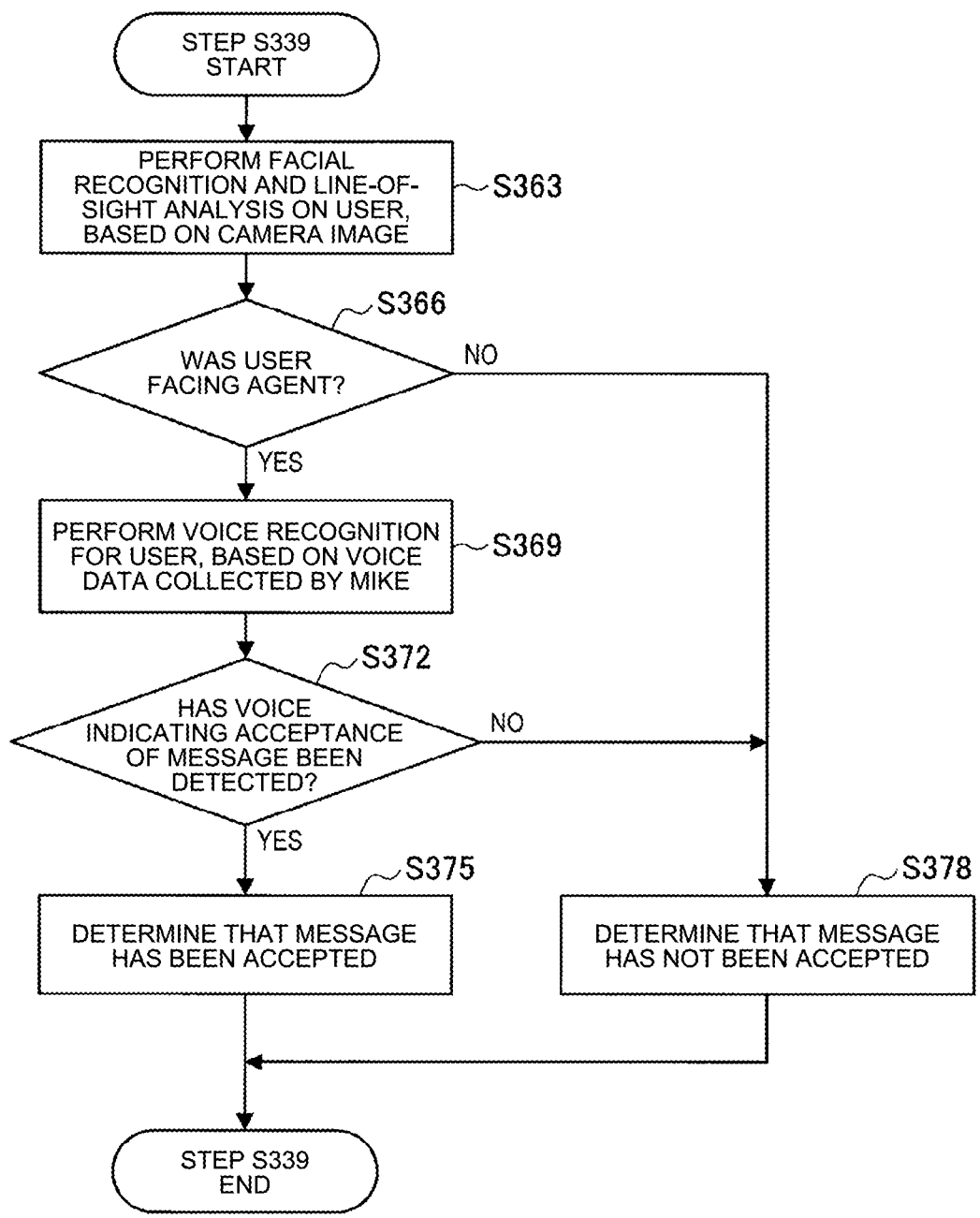
FIG. 18 is a flow chart illustrating an example of a flow of processing for determination of whether or not a message has been accepted by a user, according to Fifth Example.

FIG. 18 is a flow chart illustrating an example of a flow of processing for determination of whether or not a message has been accepted by a user, according to Fifth Example.

As illustrated in FIG. 18, firstly, the output device 1 performs, based on a camera image having a user's face captured therein by means of the sensor 122 (a camera), facial recognition and line-of-sight analysis on the user (Step S363), and determines whether or not the user has faced an agent image that has been projected as presentation of a message (that is, whether the user has directed his line of sight or face to the agent image) (Step S366).

Subsequently, if the user has not faced the agent image (Step S366/No), the output device 1 determines that the message has not been accepted (Step S378). The output device 1 may determine that the message has not been accepted if the user has turned his line of sight away immediately after just looking at the agent image for an instant, if the user's focus is not on the agent image, if the user is not looking at the agent image carefully, or if the user has looked at the agent image but looked displeased, for example.

Subsequently, based on voice data collected by the sensor 122 (mike), the output device 1 performs voice recognition (Step S369), and determines whether or not a voice indicating acceptance of the message has been detected (Step S372).

Subsequently, if a voice indicating acceptance of the message ("Understood.", "Okay.", "Sounds good.", "I see.", "Sounds interesting.", or the like) has not been detected (Step S372/No), the output device 1 determines that the message has not been accepted (Step S378). Without being limited to when a voice indicating acceptance of a message has not been detected, for example, the output device 1 may determine that a message has not been accepted when, for example, a user has sighed, the user has clicked his tongue, or a voice indicating that the user feels the presentation of the message to be obstructive has been detected.

if the user is facing the agent image (Step S366/Yes) and a voice indicating acceptance of the message has been detected (Step S372/Yes), the output device 1 determines that the message has been accepted (Step S375).

Determination of whether a message has been accepted is performed based on a line of sight and a voice as an example herein, but Fifth Example is not limited to this example. For example, the determination may be performed using either one of a line of sight and a voice, or the determination may be performed based on another element (such as behavior or gesture of the user after the message presentation).

4. Conclusion

As described above, the information processing system according to the embodiment of the present disclosure implements more effective information presentation by performing information presentation when a user is in a situation where information is easily acceptable.

A preferred embodiment of the present disclosure has been described in detail above by reference to the appended drawings, but the present techniques are not limited to this example. It is evident that a person having ordinary skill in the technical field of the present disclosure can derive various modified examples or revised examples within the scope of the technical ideas written in the patent claims, and it is understood that these modified examples or revised examples also rightfully belong to the technical scope of the present disclosure.

For example, a computer program may be generated, the computer program being for causing hardware to exert functions of the output device 1 or the management server 2 described above, the hardware being, for example, a CPU, a ROM, and RAM that are internally provided in the output device 1 or the management server 2. Furthermore, a computer readable storage medium having the computer program stored therein may also be provided.

Furthermore, the effects described in this specification are just explanatory or exemplary, and are not limiting. That is, the techniques according to the present disclosure may achieve, in addition to the above described effects or instead of the above described effects, other effects evident to those skilled in the art from the description in this specification.

The present techniques may also include the following configurations.

(1) An information processing system, comprising:
   a control unit that controls a presentation unit to present a message to a user when the user is presumed, based on sensing data related to the user, to be in a situation where a message is easily acceptable.
(2) The information processing system according to (1), wherein the control unit presumes whether or not the user is in the situation where a message is easily acceptable, according to at least any of a noise situation around the user, biological information of the user, an expression of the user, and motion information of the user.
(3) The information processing system according to (1) or (2), wherein
   the presentation unit is a projector, and
   when there is a projection place satisfying a given condition around the user, the control unit controls the projector to project the message onto the projection place.
(4) The information processing system according to (3), wherein the control unit determines, based on sensing data around the user, the projection place satisfying the given condition.
(5) The information processing system according to (3), wherein when there is a projection place visually recognizable by the user, the control unit controls the projector to project the message onto the projection place.
(6) The information processing system according to (5), wherein the control unit performs line-of-sight analysis on the user, based on the sensing data related to the user, and determines the projection place visually recognizable by the user.

(7) The information processing system according to any one of (1) to (6), wherein the control unit controls the presentation unit to present the message that is perceptible by the user.

(8) The information processing system according to (7), wherein the control unit presents the message by means of at least any of an image or a sound.

(9) The information processing system according to any one of (1) to (8), wherein the control unit controls to not perform message presentation to the user, according to content of the message, even if the user has been presumed to be in the situation where a message is easily acceptable.

(10) The information processing system according to (9), wherein the control unit
performs message presentation to the user when the content of the message matches a state of the user, and
controls to not perform message presentation to the user when the content of the message does not match the state of the user.

(11) The information processing system according to any one of (1) to (10), wherein when the user is presumed to be not in the situation where a message is easily acceptable, the control unit presents a control guide for bringing the situation of the user into a situation where a message is more easily acceptable.

(12) The information processing system according to (11), wherein the control guide is an image or a sound that is aimed to change at least any of a noise situation around the user, biological information of the user, an expression of the user, and motion information of the user.

(13) The information processing system according to (10), wherein the control unit presents a control guide for making the state of the user match the content of the message when the state of the user is presumed to not match the content of the message.

(14) The information processing system according to any one of (1) to (13), wherein the control unit
detects, based on the sensing data related to the user, a reaction of the user to the message presented by the presentation unit, and
updates the user's situation where a message is easily acceptable by learning a relation between a result of the detection and a situation of the user.

(15) The information processing system according to any one of (1) to (14), wherein the control unit controls the presentation unit to present, to the user, a message provided from an external agent system.

(16) An information processing method, wherein a processor performs processing including:
controlling a presentation unit to present a message to a user when the user is presumed, based on sensing data related to the user, to be in a situation where a message is easily acceptable.

(17) A recording medium including a program for causing a computer to function as:
a control unit that controls a presentation unit to present a message to a user when the user is presumed, based on sensing data related to the user, to be in a situation where a message is easily acceptable.

REFERENCE SIGNS LIST

1 OUTPUT DEVICE
2 MANAGEMENT SERVER
3 NETWORK
4 AGENT SYSTEM SERVER
100 CONTROL UNIT
110 COMMUNICATION UNIT
120 INPUT UNIT
121 OPERATION INPUT UNIT
122 SENSOR
122a BIOSENSOR
130 OUTPUT UNIT
131 PROJECTOR
132 SPEAKER
140 STORAGE UNIT
200 CONTROL UNIT
201 USER MANAGEMENT UNIT
202 SITUATION RECOGNITION UNIT
203 MESSAGE MANAGEMENT UNIT
204 MESSAGE PRESENTATION CONTROL UNIT
210 COMMUNICATION UNIT

The invention claimed is:

1. An information processing system, comprising:
control circuitry configured to
determine, based on at least one of biological information of a user or a facial expression of the user, whether the user is in a situation where a message can be accepted;
when determining that the user is in the situation where the message can be accepted, determine whether to present the message to the user by comparing (1) a physical state of the user, as determined by sensing data of the physical state of the user, to (2) a desired physical state of the user, as indicated by a content of the message; and
cause a projector to project the message, only when determining to present the message to the user.

2. The information processing system according to claim 1, wherein
the system further includes the projector, and
when there is a projection place satisfying a given condition around the user, the control circuitry is further configured to control the projector to project the message onto the projection place.

3. The information processing system according to claim 2, wherein the control circuitry is further configured to determine, based on sensing data around the user, the projection place satisfying the given condition.

4. The information processing system according to claim 2, wherein when there is a projection place visually recognizable by the user, the control circuitry is further configured to control the projector to project the message onto the projection place.

5. The information processing system according to claim 2, wherein the control circuitry is further configured to perform line-of-sight analysis on the user, based on sensing data related to the user, and determine the projection place visually recognizable by the user.

6. The information processing system according to claim 1, wherein the control circuitry is further configured to control the presentation of the message that is perceptible by the user.

7. The information processing system according to claim 6, wherein the control circuitry is further configured to present the message by means of at least one of an image or a sound.

8. The information processing system according to claim 1, wherein when the user is determined to be not in the situation where a message can be accepted, the control circuitry is further configured to present a control guide for bringing the situation of the user into a situation where a message can be accepted.

9. The information processing system according to claim 8, wherein the control guide presented by the control circuitry is an image or a sound that is aimed to change at least one of a noise situation around the user, the biological information of the user, the facial expression of the user, or motion information of the user.

10. The information processing system according to claim 1, wherein the control circuitry is further configured to present a control guide to make the physical state of the user match the desired physical state of the user indicated by the content of the message, when the physical state of the user is determined to not match the content of the message.

11. The information processing system according to claim 1, wherein the control circuitry is further configured to
detect, based on sensing data related to the user, a reaction of the user to the presented message, and
update the situation of the user where a message is acceptable by learning a relation between a result of the detection and a situation of the user.

12. The information processing system according to claim 1, wherein the control circuitry is further configured to control the presentation, to the user, of the message, which is provided from an external agent system.

13. An information processing method, comprising:
determining, by control circuitry, based on at least one of biological information of a user or a facial expression of the user, whether the user is in a situation where a message can be accepted;
when determining that the user is in the situation where the message can be accepted, determining whether to present the message to the user by comparing (1) a physical state of the user, as determined by sensing data of the physical state of the user, to (2) a desired physical state of the user, as indicated by a content of the message; and
causing a projector to project the message, only when determining to present the message to the user.

14. A non-transitory recording medium storing a program therein for causing a computer to perform a method comprising:
determining, based on at least one of biological information of a user or a facial expression of the user, whether the user is in a situation where a message can be accepted;
when determining that the user is in the situation where the message can be accepted, determining whether to present the message to the user by comparing (1) a physical state of the user, as determined by sensing data of the physical state of the user to (2) a desired physical state of the user, as indicated by a content of the message; and
causing a projector to project the message, only when determining to present the message to the user.

15. The information processing system of claim 1, wherein the control circuitry is further configured to determine whether or not the user is in the situation where the message can be accepted, based on at least one of heart rate information of the user, body temperature information of the user, or respiration information of the user.

16. The information processing system of claim 1, wherein the control circuitry is further configured to determine whether or not the user is in the situation where the message can be accepted based on only the facial expression of the user.

17. The information processing system of claim 1, wherein the control circuitry is further configured to perform a line-of-sight analysis on the user based on sensing data related to the user, determine a projection place visually recognizable by the user based on the line-of-sight analysis, and control the projector to project the message onto the determined projection place, wherein the line-of-sight analysis determines a direction in which the user is looking.

18. The information processing system of claim 1, wherein the control circuitry is further configured to determine the desired physical state of the user by performing semantic analysis on the content of the message.

19. The information processing system of claim 1, wherein the control circuitry is further configured to determine the desired physical state of the user by extracting supplemental information included in the message.

20. The information processing system of claim 1, wherein the control circuitry is further configured to, only when determining that the user is in the situation where the message can be accepted, determine whether there is one of a single-color plane, a mirror surface, and a still-water surface at a projectable distance onto which the message can be projected by the projector.

* * * * *